US012768696B2

(12) United States Patent
Sunaga

(10) Patent No.: US 12,768,696 B2
(45) Date of Patent: Oct. 20, 2026

(54) APPARATUS FOR FACILITATING A MEASUREMENT OF A VOLUME OF A SAMPLE PRESENT IN A CONTAINER

(71) Applicant: CompactAssays Corporation, Chuo-ku (JP)

(72) Inventor: Nobuya Sunaga, Funabashi (JP)

(73) Assignee: CompactAssays Corporation (JP)

( * ) Notice: Subject to any disclaimer, the term of this patent is extended or adjusted under 35 U.S.C. 154(b) by 75 days.

(21) Appl. No.: 18/925,297

(22) Filed: Oct. 24, 2024

(65) Prior Publication Data

US 2026/0118150 A1 Apr. 30, 2026

(51) Int. Cl.
*G01F 22/00* (2006.01)

(52) U.S. Cl.
CPC .................................... *G01F 22/00* (2013.01)

(58) Field of Classification Search
CPC .. G01F 23/2962; G01F 23/804; G01F 23/292; G01F 23/263; G01F 23/14; G01F 23/296; G01F 22/00; G01F 25/20; G01F 23/268; G01F 23/18; G01F 23/266; G01F 23/00; G01F 23/284; G01F 23/26; G01F 23/2968; G01F 23/80; G01F 23/802; G01F 23/24; G01F 23/22; G01F 23/2961; G01F 22/02; G01F 23/2921; G01F 23/02; G01F 23/265; G01F 1/002; G01F 23/72; G01F 17/00; G01F 1/007; G01F 23/76; G01F 23/20; G01F 1/52; G01F 23/04; G01F 23/242; G01F 23/2927; G01F 1/66; G01F 1/663; G01F 25/0084; G01F 1/74;
(Continued)

(56) References Cited

U.S. PATENT DOCUMENTS

| | | | | |
|---|---|---|---|---|
| 4,956,560 A * | 9/1990 | Smith, Jr. | B67C 3/20 250/577 |
| 6,068,615 A * | 5/2000 | Brown | G01F 23/26 604/207 |
| 6,195,158 B1 | 2/2001 | Cadell et al. | |
| 6,270,455 B1 * | 8/2001 | Brown | A61B 5/6896 128/920 |

(Continued)

FOREIGN PATENT DOCUMENTS

| | | | |
|---|---|---|---|
| CN | 104411349 A * | 3/2015 | A61M 5/16886 |
| DE | 10221823 A1 * | 11/2003 | G01F 23/2927 |
| DE | 102014118854 A1 * | 6/2016 | G01F 23/2921 |
| EP | 0619476 A1 * | 10/1994 | G01F 23/292 |

(Continued)

*Primary Examiner* — Michael P Stafira
(74) *Attorney, Agent, or Firm* — Dhiraj Jindal; PATENT YOGI LLC

(57) ABSTRACT

An apparatus for facilitating a measurement of a volume of a sample present in a container. The apparatus includes a lighting element, a detecting element, a holding member, a processing device, and a storage device. The detecting element is spaced apart from the lighting element. The holding member holds a container comprising a sample between the lighting element and the detecting element. The lighting element emits a light beam for irradiating the container from a first side of the container with the light beam. The detecting element detects a light intensity of a refracted light beam produced based on the irradiating, from a second side of the container. The processing device generates a light intensity data based on the detecting, analyzes the light intensity data, and generates a volume measurement of the volume of the sample based on the analyzing and a data. The storage device stores the volume measurement.

20 Claims, 36 Drawing Sheets

(58) Field of Classification Search

CPC .. G01F 23/2928; G01F 23/162; G01F 23/247; G01F 23/68; G01F 23/74; G01F 23/36; G01F 1/00; G01F 23/243; G01F 23/2965; G01F 15/08; G01F 23/185; G01F 23/0007; G01F 15/005; G01F 15/063; G01F 23/28; G01F 23/62; G01F 23/241; G01F 23/2845; G01F 13/00; G01F 23/30; G01F 23/64; G01F 1/56; G01F 23/686; G01F 1/667; G01F 23/0023; G01F 1/662; G01F 23/38; G01F 1/375; G01F 23/165; G01F 23/0046; G01F 23/261; G01F 1/86; G01F 23/246; G01F 23/2966; G01F 11/286; G01F 23/164; G01F 11/284; G01F 11/262; G01F 19/00; G01F 23/0038; G01F 23/16; G01F 23/168; G01F 1/58; G01F 13/006; G01F 15/00; G01F 23/288; G01F 1/075; G01F 11/28; G01F 25/10; G01F 1/34; G01F 23/2967; G01F 9/00; G01F 1/363; G01F 23/808; G01F 25/24; G01F 1/42; G01F 11/04; G01F 23/161; G01F 23/2924; G01F 23/363; G01F 23/70; G01F 15/06; G01F 25/00; G01F 1/684; G01F 11/32; G01F 15/18; G01F 23/248; G01F 23/2922; G01F 1/38; G01F 23/244; G01F 23/2885; G01F 1/50; G01F 1/76; G01F 11/021; G01F 13/008; G01F 15/02; G01F 15/0755; G01F 23/2925; G01F 23/40; G01F 23/44; G01F 1/28; G01F 1/72; G01F 1/8436; G01F 15/001; G01F 15/003; G01F 15/024; G01F 25/17; G01F 1/661; G01F 1/80; G01F 15/075; G01F 23/32; G01F 23/34; G01F 23/60; G01F 25/0092

See application file for complete search history.

(56) References Cited

U.S. PATENT DOCUMENTS

| | | | | |
|---|---|---|---|---|
| 6,333,512 | B1 * | 12/2001 | Wirthlin | G01F 23/2925 250/901 |
| 7,604,985 | B2 * | 10/2009 | Bachur, Jr. | C12M 41/44 435/808 |
| 10,371,559 | B2 * | 8/2019 | Truong | G01F 23/2927 |
| 11,183,278 | B2 * | 11/2021 | White | A61B 5/1495 |
| 11,650,197 | B2 * | 5/2023 | Kluckner | G01F 23/00 702/21 |
| 2001/0004285 | A1 | 6/2001 | Cadell et al. | |
| 2002/0147563 | A1 | 10/2002 | Lerche et al. | |
| 2006/0178578 | A1 * | 8/2006 | Tribble | B65B 3/003 382/128 |
| 2008/0291435 | A1 | 11/2008 | Murakami | |
| 2010/0066996 | A1 | 3/2010 | Kosaka et al. | |
| 2010/0111767 | A1 | 5/2010 | Yonekura et al. | |
| 2016/0291049 | A1 | 10/2016 | Arumugam et al. | |
| 2018/0045654 | A1 | 2/2018 | Park et al. | |
| 2018/0372715 | A1 | 12/2018 | Kluckner et al. | |
| 2019/0277870 | A1 | 9/2019 | Kluckner et al. | |
| 2019/0383793 | A1 | 12/2019 | Sugiyama et al. | |
| 2020/0151498 | A1 | 5/2020 | Sun et al. | |
| 2020/0191714 | A1 | 6/2020 | Wissmann et al. | |
| 2020/0256885 | A1 | 8/2020 | Wissmann et al. | |
| 2020/0265263 | A1 | 8/2020 | Kluckner et al. | |
| 2021/0231483 | A1 | 7/2021 | Sato et al. | |
| 2025/0085151 | A1 * | 3/2025 | Zantl | G01F 1/007 |

FOREIGN PATENT DOCUMENTS

| | | | | | |
|---|---|---|---|---|---|
| EP | 2214011 | B1 | * | 1/2019 | G01N 33/4905 |
| EP | 4521076 | A1 | * | 3/2025 | G01F 23/2921 |
| JP | 2017531454 | A | * | 10/2017 | G01F 23/2961 |
| JP | 2019527818 | A | * | 10/2019 | A61M 5/31568 |
| WO | WO-9719340 | A1 | * | 5/1997 | G01N 21/274 |
| WO | WO-2015184414 | A1 | * | 12/2015 | E21B 47/047 |
| WO | WO-2017132166 | A1 | * | 8/2017 | G06T 7/0012 |

* cited by examiner

APPARATUS FOR FACILITATING A MEASUREMENT OF A VOLUME OF A SAMPLE PRESENT IN A CONTAINER

FIELD OF THE INVENTION

Generally, the present disclosure relates to the field of data processing. More specifically, the present disclosure relates to an apparatus for facilitating a measurement of a volume of a sample present in a container.

BACKGROUND OF THE INVENTION

A microtube or Eppendorf tube is often used in life science laboratories for storing or transporting reagents or biological samples. However, a volume of a sample inside the tube is difficult to measure. Although it is important information for later assay processes as laboratories rely on self-report when accepting the transport of the sample tube. Currently, there are multiple ways to measure the volume inside the tube. However, these ways are either cumbersome or expensive. One way is to measure the weight of the sample with a precision scale. However, while measuring the sample in the precision scale it is necessary to make the sample be in contact with the precision scale. Also, the density differs from sample to sample so virtually the method cannot measure the volume of the sample. An other way is to aspirate the sample with a pipette. However, this method is cumbersome and leads to potential sample loss. Another way is to use a product such as Azenta™ Auditor. However, this method requires a computer and is expensive.

Existing techniques for facilitating a measurement of a volume of a sample present in a container are deficient with regard to several aspects. For instance, current technologies describe a volume measurement with a camera. Further, volume detection using the camera is often observed in hematology. Furthermore, current technologies describe liquid-level detection by movable sensors. For the purpose of specifying blood cells and serum, a movable photo detector and often laser light are used. Moreover, the current technologies describe an optical combination for measuring the uniformity of the dispersion of particles.

Therefore, there is a need for improved apparatus for facilitating a measurement of a volume of a sample present in a container that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating a measurement of a volume of a sample present in a container, in accordance with some embodiments. Accordingly, the apparatus may include at least one lighting element, at least one detecting element, at least one holding member, a processing device, and a storage device. Further, the at least one detecting element may be spaced apart from the at least one lighting element. Further, the at least one detecting element may be aligned with the at least one lighting element. Further, the at least one holding member may be configured for holding at least one container comprising at least one sample between the at least one lighting element and the at least one detecting element. Further, the at least one lighting element may be configured for emitting a light beam for irradiating the at least one container from a first side of the at least one container with the light beam. Further, the at least one detecting element may be configured for detecting a light intensity of a refracted light beam produced based on the irradiating of the at least one container from the first side with the light beam, from a second side of the at least one container. Further, the second side opposes the first side. Further, the processing device may be communicatively coupled with the at least one detecting element. Further, the processing device may be configured for generating a light intensity data associated with the light intensity of the refracted light beam based on the detecting. Further, the processing device may be configured for analyzing the light intensity data. Further, the processing device may be configured for generating a volume measurement of the volume of the at least one sample comprised in the at least one container based on the analyzing of the light intensity data and at least one data. Further, the storage device may be communicatively coupled with the processing device. Further, the storage device may be configured for storing the volume measurement.

Further disclosed herein is an apparatus for facilitating a measurement of a volume of a sample present in a container, in accordance with some embodiments. Accordingly, the apparatus may include at least one lighting element, at least one detecting element, at least one holding member, a processing device, and a storage device. Further, the at least one detecting element may be spaced apart from the at least one lighting element. Further, the at least one detecting element may be aligned with the at least one lighting element. Further, the at least one holding member may be configured for holding at least one container comprising at least one sample between the at least one lighting element and the at least one detecting element. Further, the at least one lighting element may be configured for emitting a light beam for irradiating the at least one container from a first side of the at least one container with the light beam. Further, the at least one detecting element may be configured for detecting a light intensity of a refracted light beam produced based on the irradiating of the at least one container from the first side with the light beam, from a second side of the at least one container. Further, the second side opposes the first side. Further, the detecting of the light intensity of the refracted light beam may include detecting a plurality of positional light intensities of the refracted light beam at a plurality of positions along a path associated with the refracted light beam. Further, the processing device may be communicatively coupled with the at least one detecting element. Further, the processing device may be configured for generating a light intensity data associated with the light intensity of the refracted light beam based on the detecting. Further, the generating of the light intensity data may be based on the detecting of the plurality of positional light intensities. Further, the light intensity data may include a plurality of positional light intensity data associated with the plurality of positional light intensities of the refracted light beam at the plurality of positions along the path of the refracted light beam. Further, the processing device may be configured for analyzing the light intensity data. Further, the processing device may be configured for generating a volume measurement of the volume of the at least one sample comprised in the at least one container based on the analyzing of the light intensity data and at least one data. Further, the storage device may be communicatively coupled with the processing device. Further, the storage device may be configured for storing the volume measurement.

Further disclosed herein is an apparatus for facilitating a measurement of a volume of a sample present in a container, in accordance with some embodiments. Accordingly, the apparatus may include at least one lighting element, at least one detecting element, at least one holding member, a processing device, a storage device, and at least one movement assembly. Further, the at least one detecting element may be spaced apart from the at least one lighting element. Further, the at least one detecting element may be aligned with the at least one lighting element. Further, the at least one holding member may be configured for holding at least one container comprising at least one sample between the at least one lighting element and the at least one detecting element. Further, the at least one lighting element may be configured for emitting a light beam for irradiating the at least one container from a first side of the at least one container with the light beam. Further, the at least one detecting element may be configured for detecting a light intensity of a refracted light beam produced based on the irradiating of the at least one container from the first side with the light beam, from a second side of the at least one container. Further, the second side opposes the first side. Further, the detecting of the light intensity of the refracted light beam may include detecting a plurality of positional light intensities of the refracted light beam at a plurality of positions along a path associated with the refracted light beam. Further, the processing device may be communicatively coupled with the at least one detecting element. Further, the processing device may be configured for generating a light intensity data associated with the light intensity of the refracted light beam based on the detecting. Further, the generating of the light intensity data may be based on the detecting of the plurality of positional light intensities. Further, the light intensity data may include a plurality of positional light intensity data associated with the plurality of positional light intensities of the refracted light beam at the plurality of positions along the path of the refracted light beam. Further, the processing device may be configured for analyzing the light intensity data. Further, the processing device may be configured for generating a volume measurement of the volume of the at least one sample comprised in the at least one container based on the analyzing of the light intensity data and at least one data. Further, the storage device may be communicatively coupled with the processing device. Further, the storage device may be configured for storing the volume measurement. Further, the at least one movement assembly may be coupled with the at least one detecting element. Further, the at least one movement assembly may be configured for moving the at least one detecting element in relation to the at least one lighting element for transitioning the at least one detecting element between the plurality of positions. Further, the detecting of the plurality of positional light intensities of the refracted light beam at the plurality of positions along the path of the refracted light beam may be based on the transitioning.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
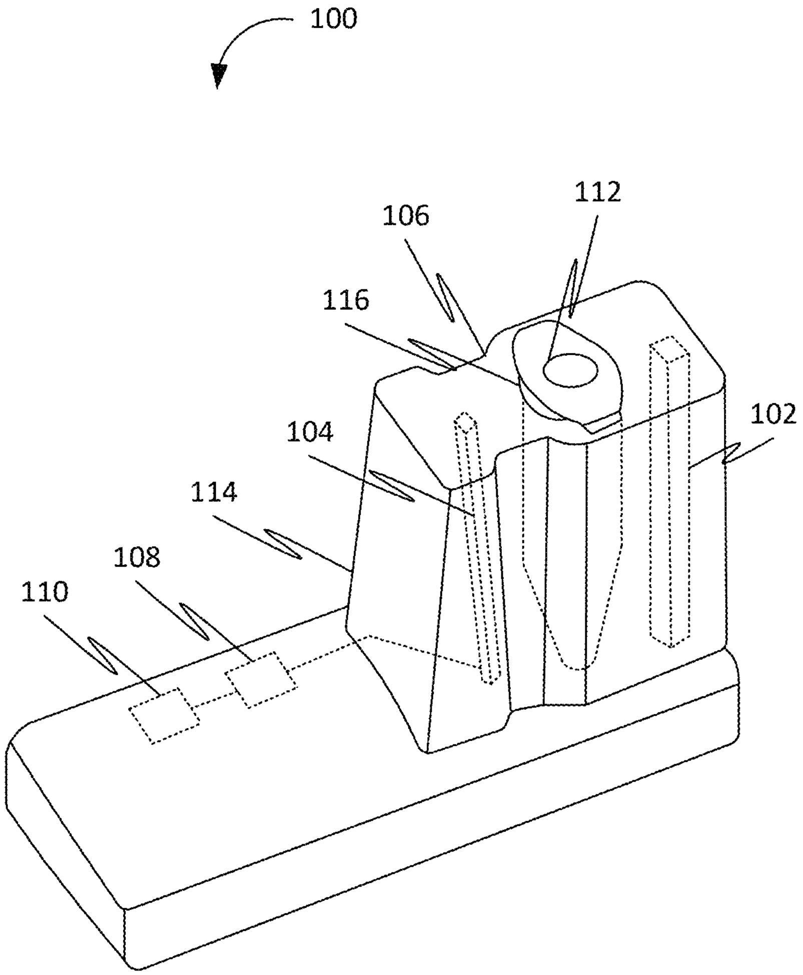
FIG. 1 is a top perspective view of an apparatus 100 for facilitating a measurement of a volume of a sample present in a container, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an apparatus for facilitating a measurement of a volume of a sample present in a container, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Overview

The present disclosure describes an apparatus for facilitating a measurement of a volume of a sample present in a container.

Further, the apparatus may include a device for measuring sample volume inside a microtube. Further, the container may include the microtube. Further, the microtube may be an Eppendorf tube.

Figure 17:
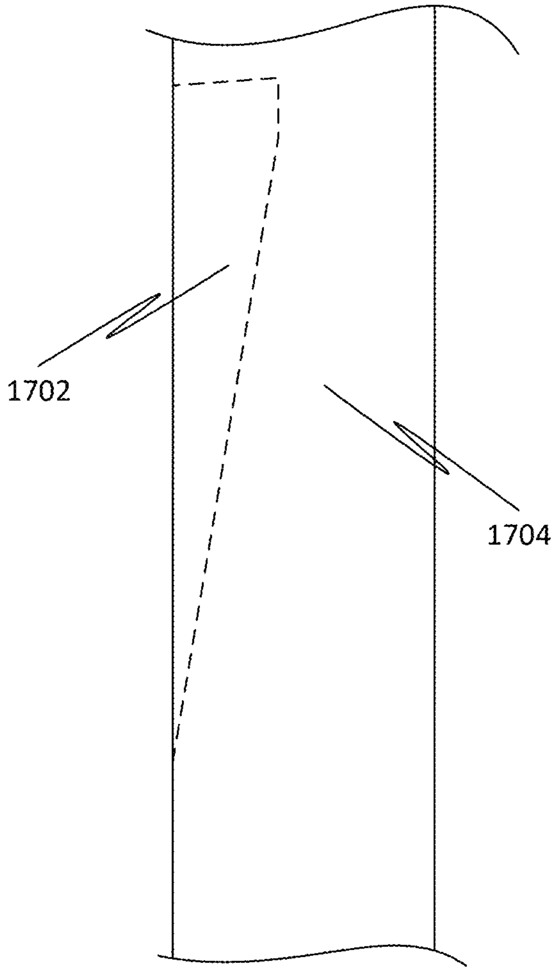
FIG. 17 illustrates a projection 1702 of light formed on a surface 1704 by a refracted light beam produced by irradiating the container 1112 comprising the sample with the light beam, in accordance with some embodiments.
Figure 22:
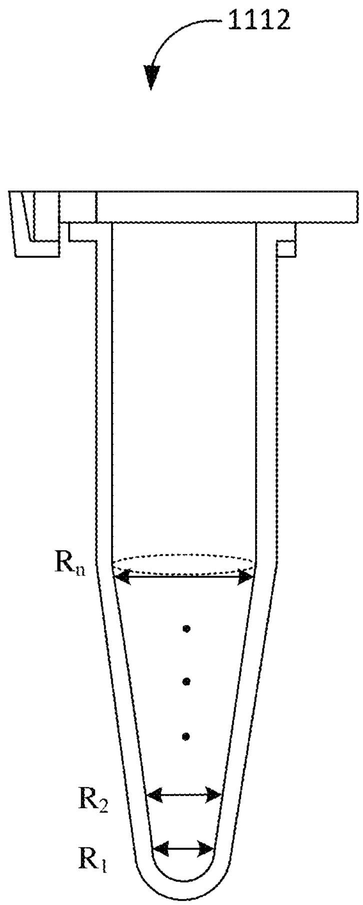
FIG. 22 is a front view of the container 1112, in accordance with some embodiments.

Further, the principal of the measurement of the volume of the sample present in the container may be based on a formulation of a focus by light through the microtube. The irradiation of parallel light from a lateral side of the microtube produces refracted light that formulates focus. Further, the principal of the measurement of the volume of the sample present in the container may be based on a focus line from the center plane. Further, the light refracts only on the area of liquid and a condensed line is formed according to focal length. Further, the principal of the measurement of the volume of the sample present in the container may be based on optical simulation. Further, in the optical simulation, the condensed line is observed at the same position. Further, examples of the profile of the optical simulation are shown in FIG. 17. Further, the principal of the measurement of the volume of the sample present in the container may be based on theoretical background. Further, the focal length depends on the tube body's diameter. Further, the tube body diameter is measurable by measuring each cross-sectional body diameter ($R_1$, $R_2$ . . . $R_n$), as shown in FIG. 22. Further, the volume may be estimated by adding each cross-sectional area. Volume V is a function of the integral of diameter R, $$V = \int_0^n \pi R_n^2$$

Diameter R is a function of refractive index n and focal length f, $$R_n = 2f_n(n-1)$$

Further, the device may include a linear actuator, a microtube, a line sensor (for example a CCD line sensor having 8 um sensing element pitch), a printed circuit board (PCB), and a light emitting diode (LED) board. Further, the measurement of the focal length may include moving the line sensor toward the microtube using a linear actuator of the device, acquiring moving distance using a linear encoder of the device, and cumulating light intensities detected at the line sensor and moving distance by a microcontroller unit (MCU) of the device. Further, the focal length is acquired by the MCU based on the light intensities and the moving distance.

Further, the device measures the focal length by light intensities detected at the detector. Since the focal point is less obvious without having additional parts, the device may include a light shading plate that divides light into two ray trajectories, and light intensities will be maximum at the focal point where two trajectories meet. Further, the detector may include a slit at the light entrance of the detector (or sensor).

Further, the measurement of the volume of the sample requires a refractive index of the sample. The focal length varies for different refractive index. The device has a secondary light source to measure the refractive index. In cartesian coordinates, the formula of the focal length of the lens gives the following with height h, diameter r, and focal length f, $$f = \frac{R}{2(n-1)}$$

Incident line angle $\theta_1$ is a function of the known variable, height h $$\theta_1 = \tan^{-1}\frac{2f(n-1)}{h} \quad \text{(eq. 1)}$$

Figure 27:
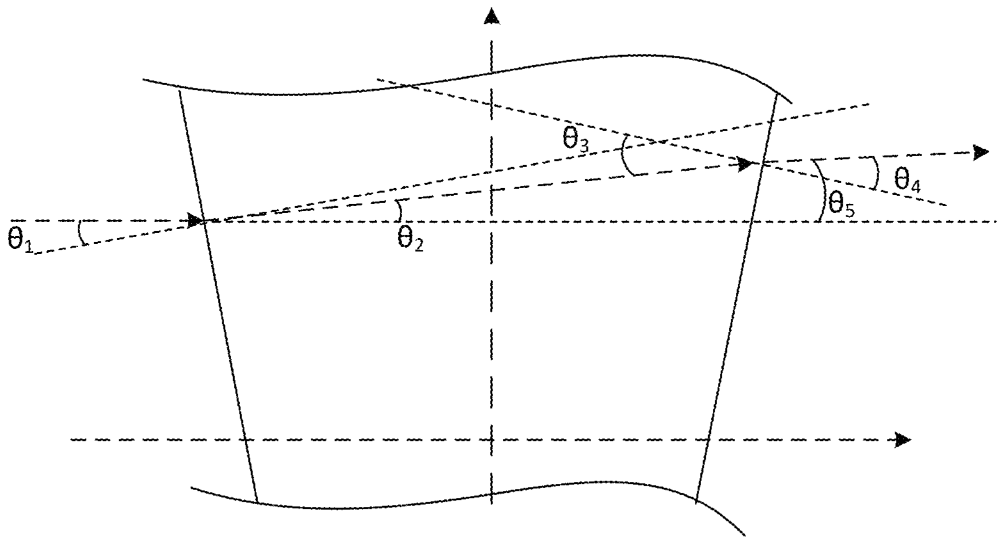
FIG. 27 illustrates a propagation of a light ray refracting based on the container 1112, in accordance with some embodiments.

On the other hand, as shown in FIG. 27, Snell's law gives the following taking as the first refractive angle as $\theta_2$, those of the second $\theta_3$, the angle enters the air $\theta_4$, and the final angle $\theta_5$ taking from $\theta_1$ then, $$\theta_2 = \sin^{-1}\left(\frac{\sin\theta_1}{n}\right) \quad \text{(eq. 2)}$$

-continued $$\theta_3 = 2\theta_1 - \theta_2 = 2\theta_1 - \sin^{-1}\left(\frac{\sin\theta_1}{n}\right)$$

$$\theta_4 = \sin^{-1}(n\sin\theta_3) = \sin^{-1}\left(n\sin\left(2\theta_1 - \sin^{-1}\left(\frac{\sin\theta_1}{n}\right)\right)\right)$$

$$\theta_5 = \theta_4 - \theta_1 = \sin^{-1}\left(n\sin\left(2\theta_1 - \sin^{-1}\left(\frac{\sin\theta_1}{n}\right)\right)\right) - \theta_1$$

The combination of eq. 1 and eq. 2 gives the following and the formula uniquely decides refractive index n by known variables, $\theta_5$, f, h.

$$\theta_5 = \sin^{-1}\left(n\sin\left(2\tan^{-1}\left(\frac{2f(n-1)}{h}\right) - \sin^{-1}\left(\frac{\sin\left(\tan^{-1}\left(\frac{2f(n-1)}{h}\right)\right)}{n}\right)\right)\right) - \tan^{-1}\left(\frac{2f(n-1)}{h}\right) \quad \text{(eq. 3)}$$

Figure 28:
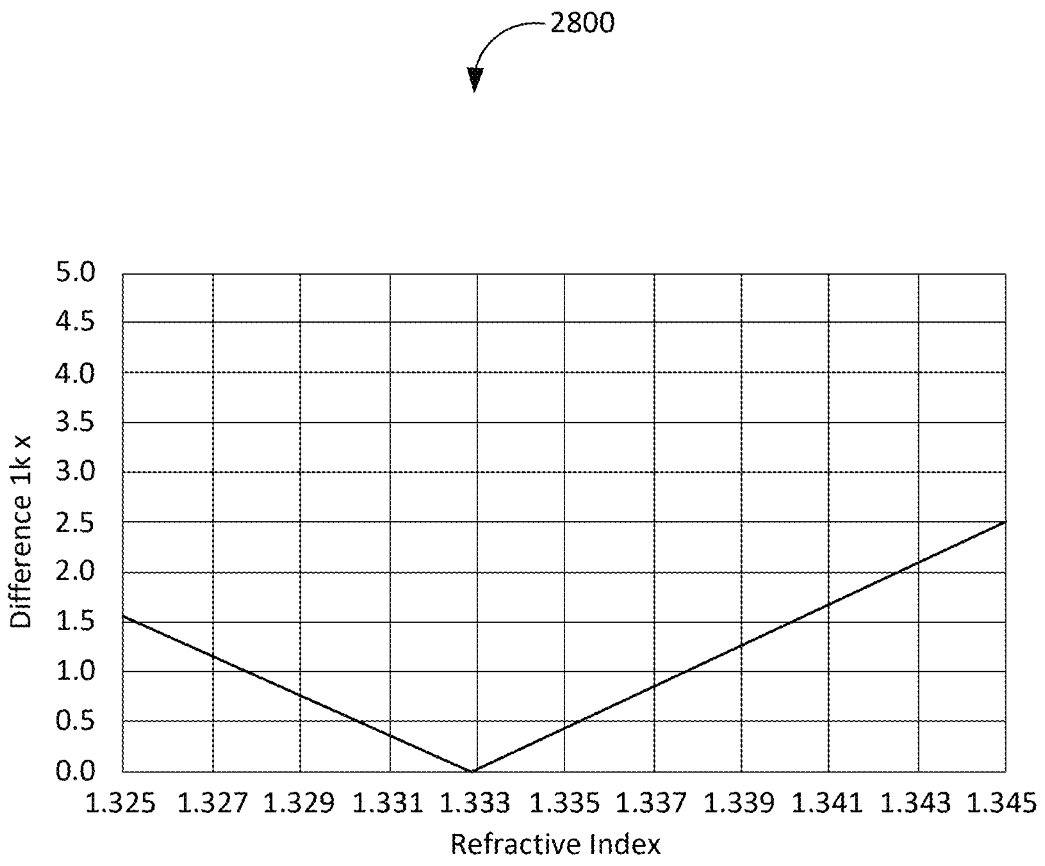
FIG. 28 illustrates a graph 2800 of a Delta $\theta_5$ versus a refractive index for the sample, in accordance with some embodiments.
Figure 29:
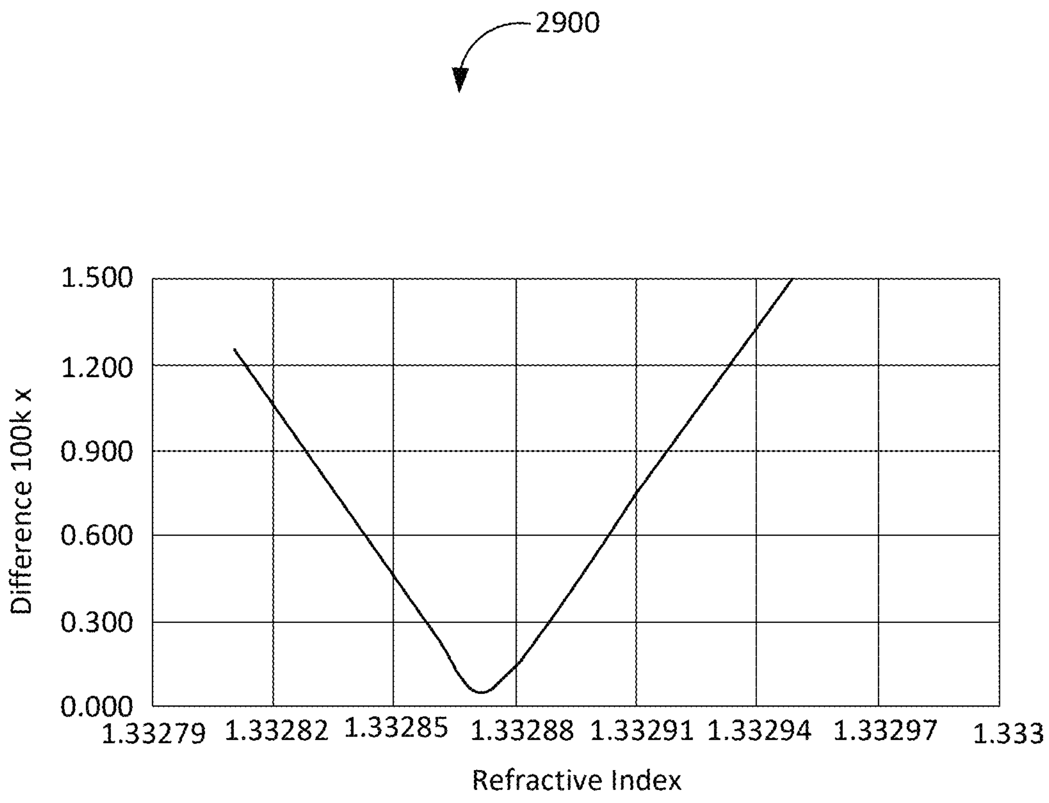
FIG. 29 illustrates a graph 2900 of a Delta $\theta_5$ versus a refractive index for the sample, in accordance with some embodiments.

The graph 2800, as shown in FIG. 28, shows the result of numerical calculation using eq. 3. The Y axis of the graph 2800 indicates delta θ5 (the difference between actually measured θ5 and numerically calculated θ5), simulating with different refractive indices. Further, numerical calculations are run by consecutively or randomly applying different refractive indices to find where the delta θ5 is minimum. The graph 2800 shows the convergence of numerical calculation to convert to a particular refractive index value. The graph 2900, as shown in FIG. 29, is an enlarged representation of the graph 2800. Further, the graph 2900 shows the small calculation difference. Further, the graph 2800 and the graph 2900 show an exemplary measurement of the sample comprising the water. Further, the actual refractive index of the water is 1.333. The calculated refractive index (where the minimum θ5 is from FIG. 29) is around 1.3328, then the difference between the actual and calculated is 0.0002.

Further, the present disclosure describes a sample volume measuring apparatus for measuring a conically or cylindrically retained liquid sample inside an optical transmittable sample container. Further, the sample volume measuring apparatus may include a support member for holding said sample container, a light source for irradiating parallel light toward said sample container covering the height of said liquid sample from at least one lateral side, a sensor having linearly aligned a plurality of photo electrical elements with a single row covering the height of said liquid sample where said sensor arranged at the distance of equal magnification of projecting refractive light through said liquid sample, and a calculation member calculating sample volume of said liquid sample from light intensities detected at said photo electrical elements.

Further, the present disclosure describes a sample volume measuring apparatus for measuring a conically or cylindrically retained liquid sample inside an optical transmittable sample container. Further, the sample volume measuring apparatus may include a support member for holding said sample container, a light source for irradiating parallel light toward said sample container covering the height of said liquid sample from at least one lateral side, a sensor having linearly aligned a plurality of photo electrical elements with a single row covering the height of said liquid sample, an adjustment member for adjusting a distance between said sensor and said sample container to be an equal magnification of projecting refractive light through said liquid sample and a calculation member for calculating sample volume from a focal length calculated from adjusted position to be equal magnification by said adjustment member and light intensities detected at said photo electrical elements.

Further, the sample volume measuring apparatus may include a secondary light source for irradiating a conical part of one of the said sample container. Further, the said calculation member comprises a computational member for calculating a refractive index of said liquid sample by refraction angle between the incident and refracted light formulating by irradiation of said secondary light source. Further, the said calculation member further includes the computational member to calculate the volume of said liquid sample by said focal length, light intensities detected at said photo electrical elements, and said refractive index.

Further, the sample volume measuring apparatus may include a light shading member that blacks out incident light of said light source only on the part facing said sensor.

Further, the said sensor further may include a slit shading except for said photo electrical elements.

FIG. 1 is a top perspective view of an apparatus 100 for facilitating a measurement of a volume of a sample present in a container, in accordance with some embodiments. Accordingly, the apparatus 100 may include at least one lighting element 102, at least one detecting element 104, at least one holding member 106, a processing device 108, and a storage device 110. Further, the apparatus 100 may include a device for measuring the volume of the sample inside the container. Further, the apparatus 100 may include a sample volume measuring apparatus.

Further, the at least one detecting element 104 may be spaced apart from the at least one lighting element 102. Further, the at least one detecting element 104 may be aligned with the at least one lighting element 102. Further, the at least one detecting element 104 may include a sensor unit, a detector unit, a detector, a line sensor, a photo sensor, a photoelectric element, etc. Further, the at least one lighting element 102 may include a light emitting device, a lighting unit, a light emitting diode (LED) board, etc. Further, the at least one lighting element 102 may include a light source, a light emitting diode, a tunable light emitting diode, a laser diode, an infrared light emitting diode, an ultraviolet light emitting diode, a quantum dot light emitting diode, a multispectral light emitting diode, a hyperspectral light emitting device, etc. Further, the at least one lighting element 102 may include a point light source, an extended light source, etc. Further, the at least one detecting element 104 may correspond to the at least one lighting element 102.

Further, the at least one holding member 106 may be configured for holding at least one container 112 comprising at least one sample between the at least one lighting element 102 and the at least one detecting element 104. Further, the at least one holding member 106 may include a support member. Further, the at least one holding member 106 may include a frame, a structure, a receptacle, etc. Further, the at least one holding member 106 receives the at least one container 112. Further, the at least one container 112 may include a tube, a test tube, a microtube, an Eppendorf tube, a sample collection tube, a sample storing tube, a vessel, an optically transmittable sample container, etc. Further, the at least one container 112 may include a bottom portion and a top portion. Further, the bottom portion may be conically shaped defining a closed end. Further, the top portion may be cylindrically shaped defining an open end. Further, the at least one container 112 may be comprised of at least one material having a degree of optical transparency. Further, the at least one material may include polypropylene (PP), polycarbonate (PC), polyethylene (PE), polymethyl methacrylate (PMMA), borosilicate glass, soda-lime glass, silica glass, etc. Further, the at least one container 112 may be transparent. Further, the at least one container 112 has a degree of optical transparency. Further, the at least one sample may include a biological sample, a biological fluid, a reagent, etc. Further, the at least one sample may have a degree of optical transparency. Further, the at least one container 112 may be positioned between the at least one lighting element 102 and the at least one detecting element 104 based on the holding. Further, the at least one lighting element 102 may be configured for emitting a light beam for irradiating the at least one container 112 from a first side of the at least one container 112 with the light beam. Further, the light beam may include a parallel light beam, a collimated light beam, a diverging light beam, etc. Further, the irradiating may include exposing, lighting, illuminating, etc. Further, the first side may be a first lateral side of the at least one container 112. Further, the at least one detecting element 104 may be configured for detecting a light intensity of a refracted light beam produced based on the irradiating of the at least one container 112 from the first side with the light beam, from a second side of the at least one container 112. Further, the refracted light beam may include a parallel light beam, a collimated light beam, a converging light beam, etc. Further, the at least one container comprising the at least one sample refracts the light beam irradiating the at least one container comprising the at least one sample for producing the refracted light beam. Further, the second side may include a second lateral side of the at least one container 112. Further, the second side opposes the first side. Further, the refracted beam forms a projection, a profile, a boundary, an outline, a focus line, an image, etc., of the at least one sample comprised in the at least one container 112. Further, the forming of the projection may be based on a converging of the refracted light beam refracting by the at least one sample. Further, the refracted light beam refracted by a sample portion of the at least one container 112 comprising the at least one sample converges to form the projection, the profile, the boundary, the outline, the focus line, the image, etc. Further, the refracted light beam refracted a non sample of the at least one container 112 comprising the at least one sample that does not converge to form the projection, the profile, the boundary, the outline, the focus line, the image, etc. Further, the sample portion of the at least one container 112 may have the at least one sample. Further, the non sample of the at least one container 112 may not have the at least one sample. Further, the at least one detecting element 104 may be at a distance of an equal magnification from the at least one container 112 comprising the at least one sample.

Further, the processing device 108 may be communicatively coupled with the at least one detecting element 104. Further, the processing device 108 may include a processor, a processing unit, a controller, a microcontroller, a microprocessor, a microcontroller unit (MCU), etc. Further, the processing device 108 may be comprised in a printed circuit board (PCB). Further, the processing device 108 may include a calculation member, Further, the processing device 108 may be configured for generating a light intensity data associated with the light intensity of the refracted light beam based on the detecting. Further, the light intensity data may include the light intensity of the refracted light beam. Further, the processing device 108 may be configured for analyzing the light intensity data. Further, the processing device 108 may be configured for generating a volume measurement of the volume of the at least one sample comprised in the at least one container 112 based on the analyzing of the light intensity data and at least one data. Further, the at least one data may include a position data of a position of the at least one container 112 in relation to the at least one detecting element 104 and the at least one lighting element 102. Further, the at least one data may include a distance from a center of the at least one container 112 to the at least one detecting element 104 and the at least one lighting element 102. Further, the at least one data may include a refractive index of the at least one sample, a refractive index of the at least one container 112, etc. Further, the at least one data may include an angle of incidence of a light ray along a length of the at least one container 112 comprising the at least one sample on the first side, an angle of refraction of a refracted light ray along the length of the at least one container 112 comprising the at least one sample on the second side, etc.

Further, the storage device 110 may be communicatively coupled with the processing device 108. Further, in an embodiment, the processing device 108 may include a central processing unit (CPU), and the storage device 110 may include a flash memory. Further, the CPU and the flash memory may be comprised in a microcontroller unit (MCU). Further, in an embodiment, the processing device 108 may be comprised in the MCU and the storage device 110 may include an external memory. Further, the storage device 110 may be configured for storing the volume measurement. Further, the volume measurement may include the volume of the at least one sample.

Figure 2:
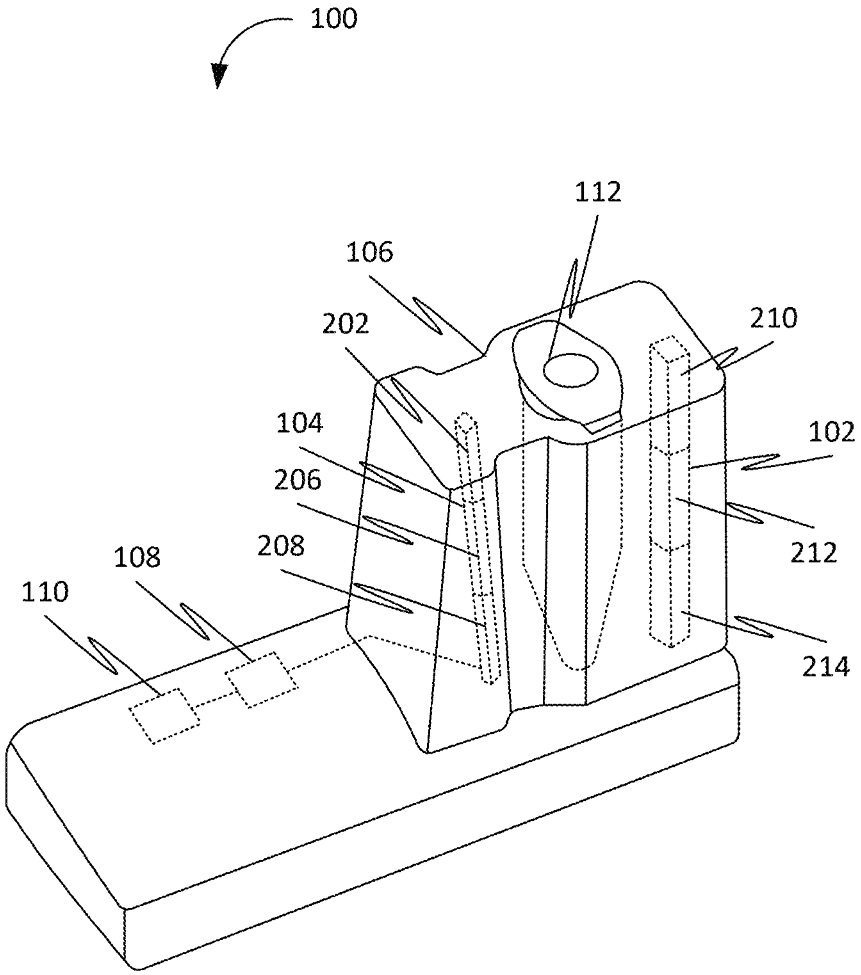
FIG. 2 is a top perspective view of the apparatus 100, in accordance with some embodiments.

Further, in some embodiments, the at least one lighting element 102 may include a plurality of lighting elements 210-214, as shown in FIG. 2. Further, the plurality of lighting elements 210-214 may be vertically arranged. Further, the plurality of lighting elements 210-214 may extend to a first height based on the vertical arrangement. Further, the first height of the plurality of lighting elements 210-214 may be equal to a height of the at least one container 112. Further, the plurality of lighting elements 210-214 may be linearly aligned. Further, the plurality of lighting elements 210-214 may be configured for emitting a plurality of light beams for irradiating a plurality of sections of the at least one container 112 from the first side of the at least one container 112. Further, the emitting of the light beam for the irradiating of the at least one container 112 from the first side of the at least one container 112 may include the emitting of the plurality of light beams for the irradiating of the plurality of sections of the at least one container 112 from the first side of the at least one container 112.

Further, in an embodiment, the at least one detecting element 104 may include a plurality of detecting elements 202-208, as shown in FIG. 2. Further, the plurality of detecting elements 202-208 may be vertically arranged. Further, the plurality of detecting elements 202-208 may extend to a second height based on the vertical arrangement. Further, the second height of the plurality of detecting elements 202-208 may be equal to the height of the at least one container 112. Further, the plurality of detecting elements 202-208 may be linearly aligned. Further, the irradiating of the at least one container 112 from the first side of the at least one container 112 with the light beam may include irradiating a plurality of sections of the at least one container 112 from the first side of the at least one container 112 with a plurality of light beams. Further, the plurality of detecting elements 202-208 may be configured for detecting a plurality of light intensities of a plurality of refracted light beams produced based on the irradiating of the plurality of sections from the first side with the plurality of light beams, from the second side of the at least one container 112. Further, the detecting of the light intensity of the refracted light beam produced based on the irradiating of the at least one container 112 from the first side with the light beam may include the detecting of the plurality of light intensities of the plurality of refracted light beams produced based on the irradiating of the plurality of sections from the first side with the plurality of light beams, from the second side of the at least one container 112.

Further, in some embodiments, the detecting of the light intensity of the refracted light beam may include detecting a plurality of positional light intensities of the refracted light beam at a plurality of positions along a path associated with the refracted light beam. Further, the path may be a transmission line of the refracted light beam from the at least one container 112 comprising the at least one sample. Further, the light intensity of the refracted light beam varies along the path. Further, the plurality of positions corresponds to a plurality of distances of the at least one detecting element 104 from a center of the at least one container 112 comprising the at least one sample. Further, the center may include an axial center, a longitudinal center, etc. of the at least one container comprising the at least one sample. Further, the center may be an axis, a line, etc. Further, the generating of the light intensity data may be further based on the detecting of the plurality of positional light intensities. Further, the light intensity data may include a plurality of positional light intensity data associated with the plurality of positional light intensities of the refracted light beam at the plurality of positions along the path of the refracted light beam.

Further, in an embodiment, the processing device 108 may be configured for identifying a first position from the plurality of positions based on the analyzing. Further, a first positional light intensity of the refracted light beam at the first position may be maximum among the plurality of positional light intensities. Further, the processing device 108 may be configured for generating a first position data for the first position based on the identifying of the first position. Further, the generating of the volume measurement may be further based on the first position data.

Figure 3:
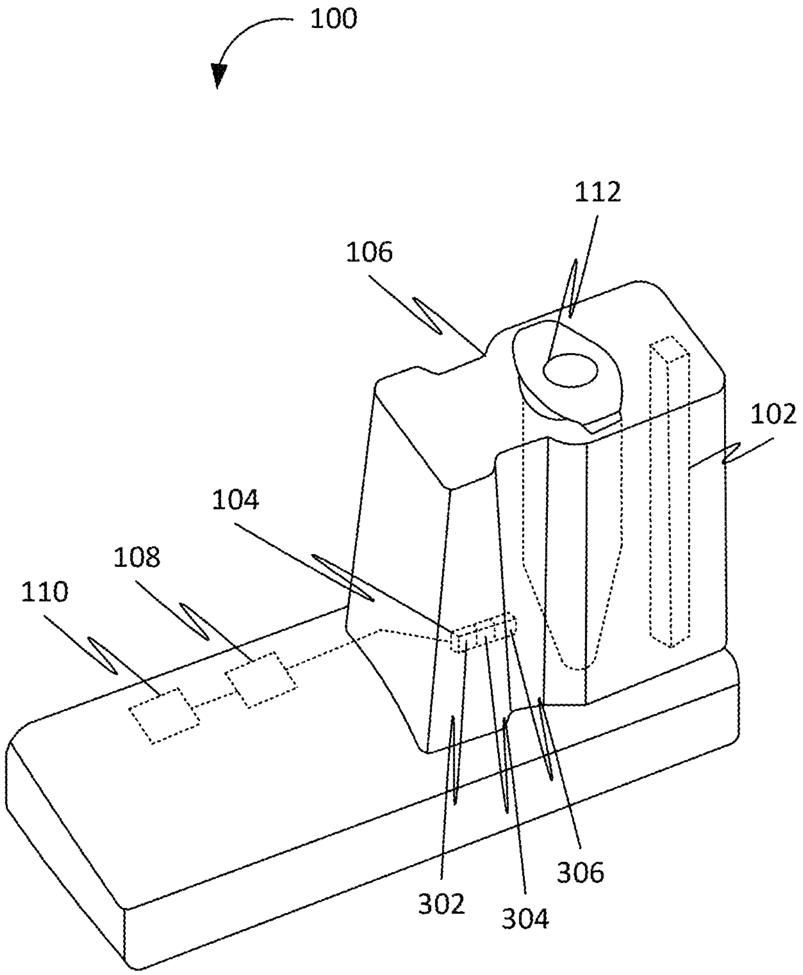
FIG. 3 is a top perspective view of the apparatus 100, in accordance with some embodiments.

Further, in an embodiment, the at least one detecting element 104 may include a plurality of detecting elements 302-306, as shown in FIG. 3. Further, each of the plurality of detecting elements 302-306 may be configured for detecting each of the plurality of positional light intensities of the refracted light beam at each of the plurality of positions along the path of the refracted light beam. Further, the plurality of detecting elements 302-306 may be horizontally arranged along the path. Further, the plurality of detecting elements 302-306 may be linearly aligned in a direction parallel to the path. Further, the plurality of detecting elements 302-306 may include an array of detecting elements. Further, the plurality of detecting elements 302-306 may include a stacked array of transparent photo sensors. Further, the detecting of the plurality of positional light intensities of the refracted light beam at the plurality of positions along the path associated with the refracted light beam may be further based on the detecting of each of the plurality of positional light intensities of the refracted light beam at each of the plurality of positions along the path of the refracted light beam.

Figure 4:
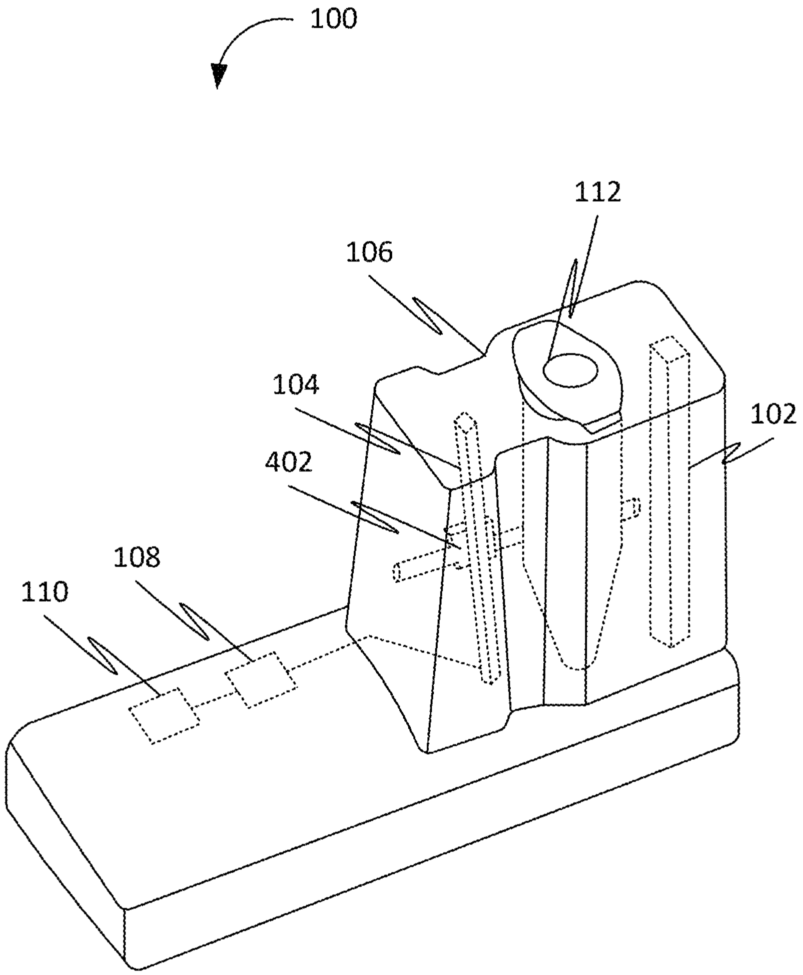
FIG. 4 is a top perspective view of the apparatus 100, in accordance with some embodiments.

Further, in an embodiment, the apparatus 100 may include at least one movement assembly 402, as shown in FIG. 4, coupled with the at least one detecting element 104. Further, the at least one movement assembly 402 may include a linear actuator, a lead screw mechanism, an adjustment member, etc. Further, the at least one movement assembly 402 may include a motorized lead screw linear actuator. Further, the at least one movement assembly 402 may include a piezoelectric actuator, a voice coil motor (VCM), a pneumatic cylinder, a solenoid actuator, a motorized rack or pinion actuator, etc. Further, the at least one movement assembly 402 may be configured for moving the at least one detecting element 104 in relation to the at least one lighting element 102 for transitioning the at least one detecting element 104 between the plurality of positions. Further, the detecting of the plurality of positional light intensities of the refracted light beam at the plurality of positions along the path of the refracted light beam may be further based on the transitioning. Further, the at least one movement assembly 402 may include a screw (such as a ball screw, a trapezoidal screw, a lead screw, etc.), a nut (such as a ball screw nut, a trapezoidal screw nut, a lead screw nut, etc.), and a motor (such as a stepper motor, a servo motor, a DC motor, etc.). Further, the nut may be threadedly coupled with the screw. Further, the motor may be mechanically coupled with the screw. Further, the nut may be mechanically coupled with the at least one detecting element 104. Further, the at least one movement assembly 402 may include a position detector (such as an encoder (such as a magnetic linear encoder, an optical linear encoder, etc), a position sensor, etc.) for detecting a position of the at least one detecting element 104 in relation to a center of the at least one container 112 comprising the at least one sample based on the transitioning. Further, the processing device 108 may be configured for generating a position data for the position of the at least one detecting element 104 based on the detecting of the position.

Figure 5:
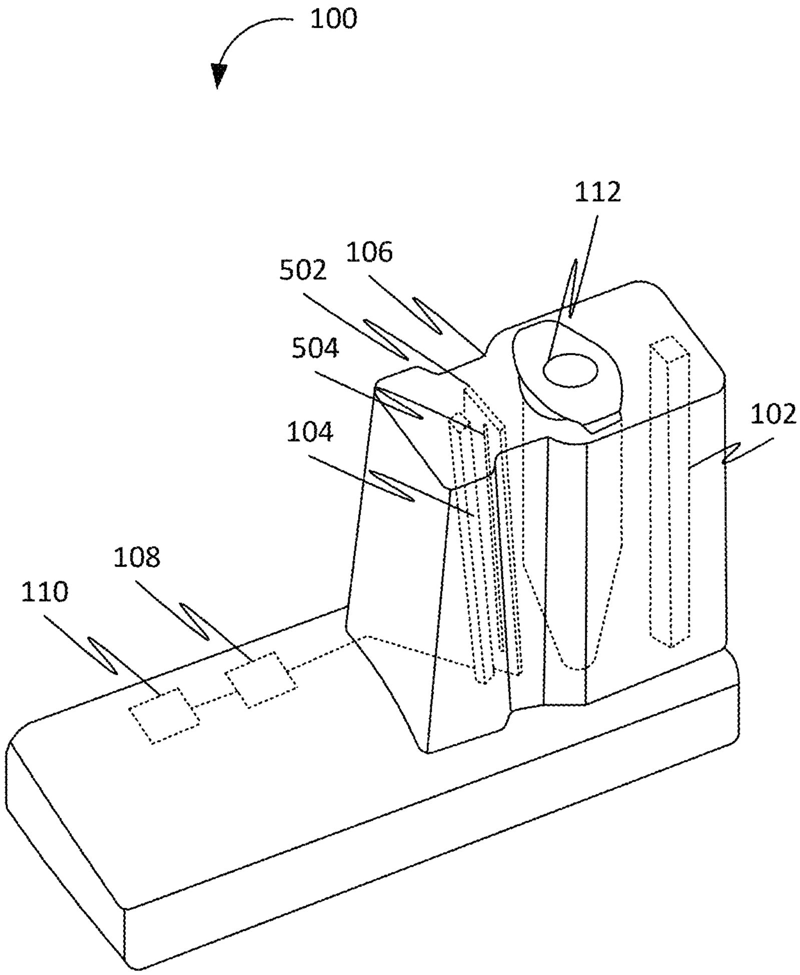
FIG. 5 is a top perspective view of the apparatus 100, in accordance with some embodiments.

In further embodiments, the apparatus 100 may include at least one panel 502, as shown in FIG. 5, coupled with the at least one detecting element 104. Further, the at least one panel 502 may block light from reaching the at least one detecting element 104. Further, the at least one panel 502 may include at least one slit 504, as shown in FIG. 5. Further, the at least one 502 may light passing through the at least one slit 504 to reach the at least one detecting element 104. Further, the at least one panel 502 covers the at least one detecting element 104 and allows the light passing through the at least one slit 504 to the at least one detecting element 104. Further, the at least one slit 504 may be a longitudinal opening in the at least one panel 502. Further, the at least one panel may be optically opaque. Further, the at least one panel 502 may be configured for exposing the at least one detecting element 104 to the refracted light beam at a point of convergence of a plurality of light rays of the refracted beam through the at least one slit 504. Further, the detecting of the intensity of the refracted light beam may be further based on the exposing. Further, the at least one slit 504 may be associated with a width. Further, the width of the at least one slit 504 ranges from 0.2 mm to 0.8 mm. Further, the at least one panel 502 may be associated with a thickness. Further, the thickness of the at least one panel 502 ranges from 0.1 mm to 0.5 mm.

Figure 6:
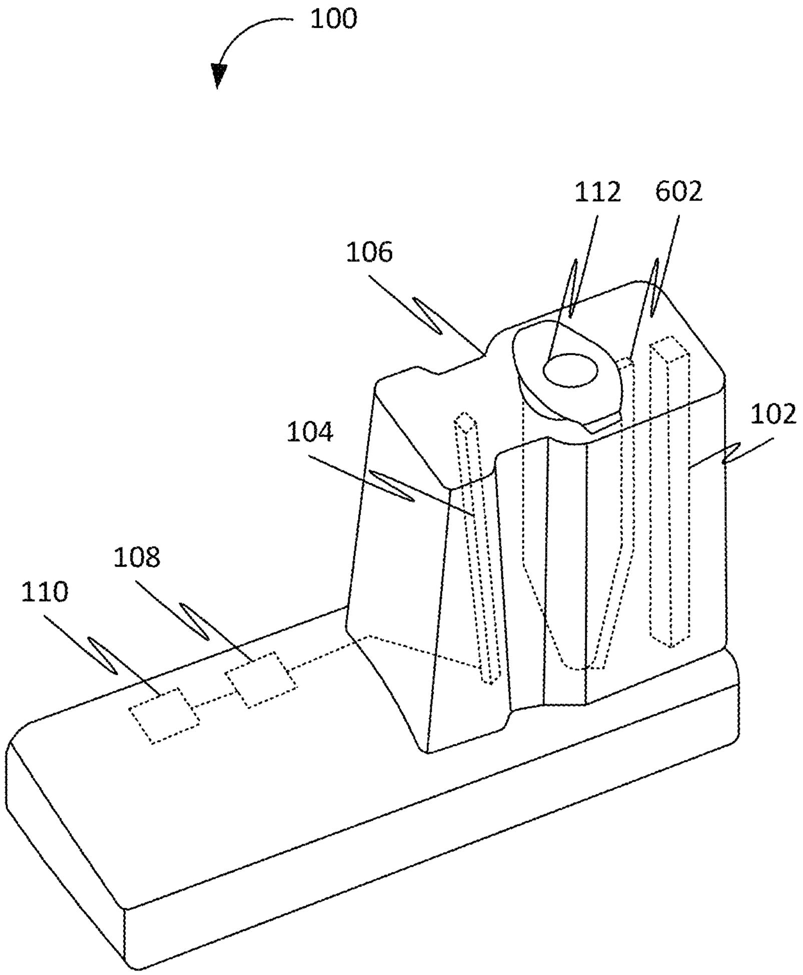
FIG. 6 is a top perspective view of the apparatus 100, in accordance with some embodiments.

Further, in some embodiments, the at least one holding member 106 may include at least one shading element 602, as shown in FIG. 6. Further, the at least one shading element 602 may be configured for blocking a portion of the light beam for producing a first light beam portion of the light beam and a second light beam portion of the light beam. Further, the irradiating of the at least one container 112 from the first side with the light beam may include irradiating a first side region of the at least one container 112 with the first light beam portion and a second side region of the at least one container 112 with the second light beam portion while preventing an irradiation of a central region of the at least one container 112 based on the blocking. Further, the first side region opposes the second side region. Further, the at least one shading element 602 may be disposed adjacent to the portion of the at least one container 112 comprising the at least one sample based on the holding. Further, the at least one shading element 602 may be optically opaque. Further, the at least one shading element 602 may include a shading plate, a light shading member, etc.

Further, in some embodiments, the processing device 108 may be further configured for determining at least one value of at least one parameter based on the analyzing of the intensity data. Further, the generating of the volume measurement may be further based on the at least one value of the at least one parameter. Further, the at least one parameter may include a height of the at least one sample comprised in the at least one container, a shape of the at least one sample comprised on the at least one container, a refractive index of the at least one sample, a focal point of the refracted light beam produced by the irradiating of the at least one container 112 comprising the at least one sample, etc.

Further, in some embodiments, the processing device 108 may be configured for determining at least one characteristic of the light beam. Further, the at least one characteristic of the light beam may include a wavelength, an intensity, a frequency, a polarization, a light beam shape, a light beam width, a light beam spread, a light beam angle, etc. Further, the processing device 108 may be configured for generating at least one command for the at least one lighting element 102 based on the determining of the at least one characteristic of the light beam. Further, the at least one lighting element 102 may be operatively coupled with the processing device 108. Further, the emitting of the light beam may include emitting the light beam with the at least one characteristic based on the at least one command. Further, in an embodiment, the determining of the at least one characteristic may be based on the at least one data. Further, the at least one data may include a refractive index of the at least one sample, a refractive index of the at least one container, an optical transparency characteristic of the at least one sample, an optical transparency characteristic of the at least one container, etc.

Figure 7:
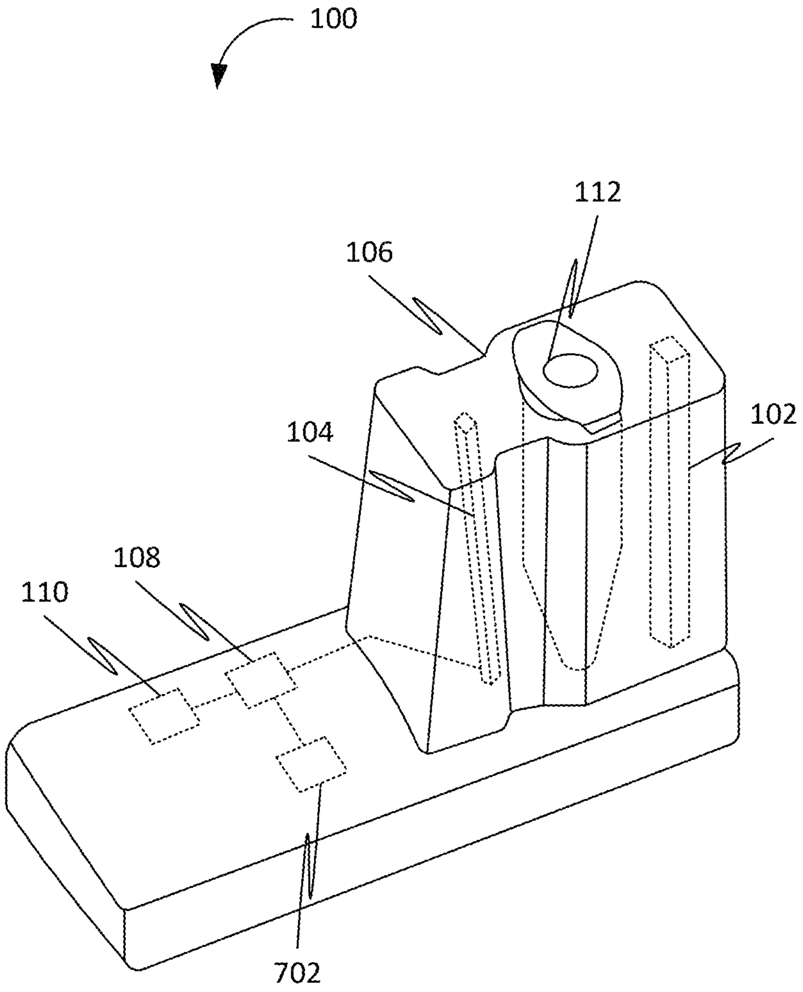
FIG. 7 is a top perspective view of the apparatus 100, in accordance with some embodiments.

In further embodiments, the apparatus 100 may include at least one input device 702, as shown in FIG. 7, communicatively coupled with the processing device 108. Further, the at least one input device 702 may be configured for receiving at least one input from a user. Further, the determining of the at least one characteristic of the light beam may be based on the at least one input. Further, the at least one input device 702 may include one or more keys, one or more switches, one or more knobs, a touch screen, etc. Further, the at least one input may include an action, a gesture, a movement, etc. Further, the at least one input device 702 may include a computing device, a user device, a client device, etc.

Figure 8:
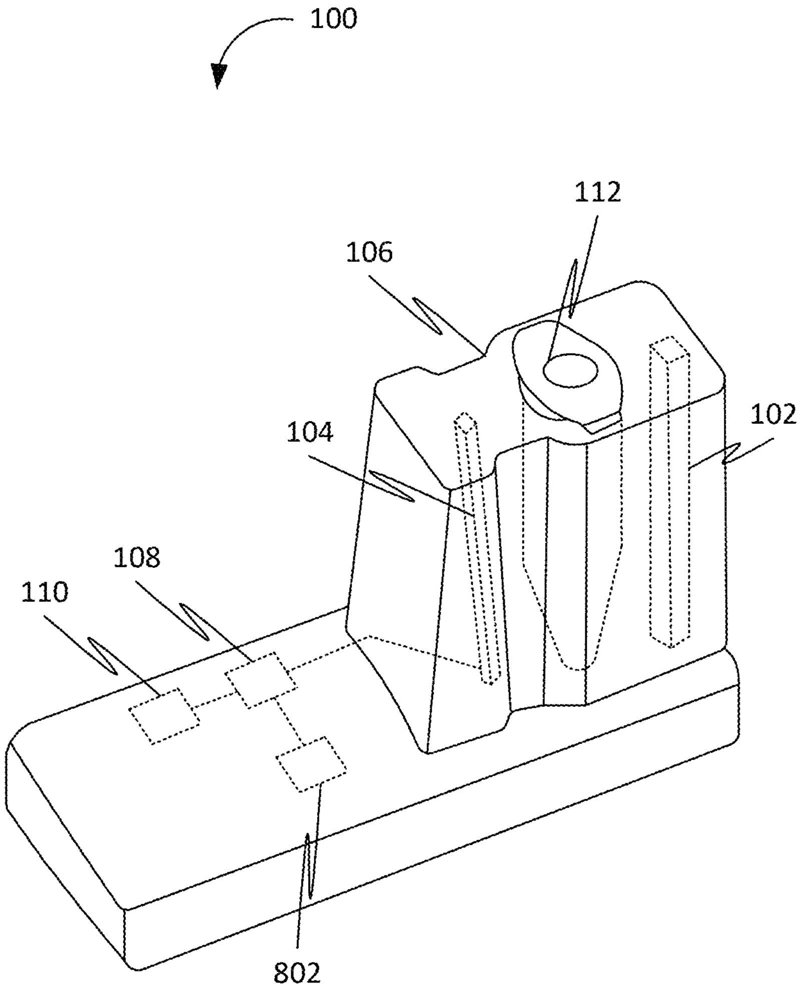
FIG. 8 is a top perspective view of the apparatus 100, in accordance with some embodiments.

In further embodiments, the apparatus 100 may include at least one sensor 802, as shown in FIG. 8, communicatively coupled with the processing device 108. Further, the at least one sensor 802 may be configured for detecting at least one sample characteristic of the at least one sample comprised in the at least one container 112. Further, the processing device 108 may be configured for generating at least one sample data of the at least one sample based on the detecting of the at least one sample characteristic. Further, the processing device 108 may be configured for analyzing the at least one sample data. Further, the determining of the at least one characteristic of the light beam may be based on the analyzing of the at least one sample data. Further, the at least one sensor 802 may include a density sensor, a transparency sensor, a temperature sensor, a pH sensor, etc. Further, the at least one sample characteristic may include a density, an optical transparency, a temperature, a pH, etc. Further, the at least one sample data may include the at least one sample characteristic.

Figure 9:
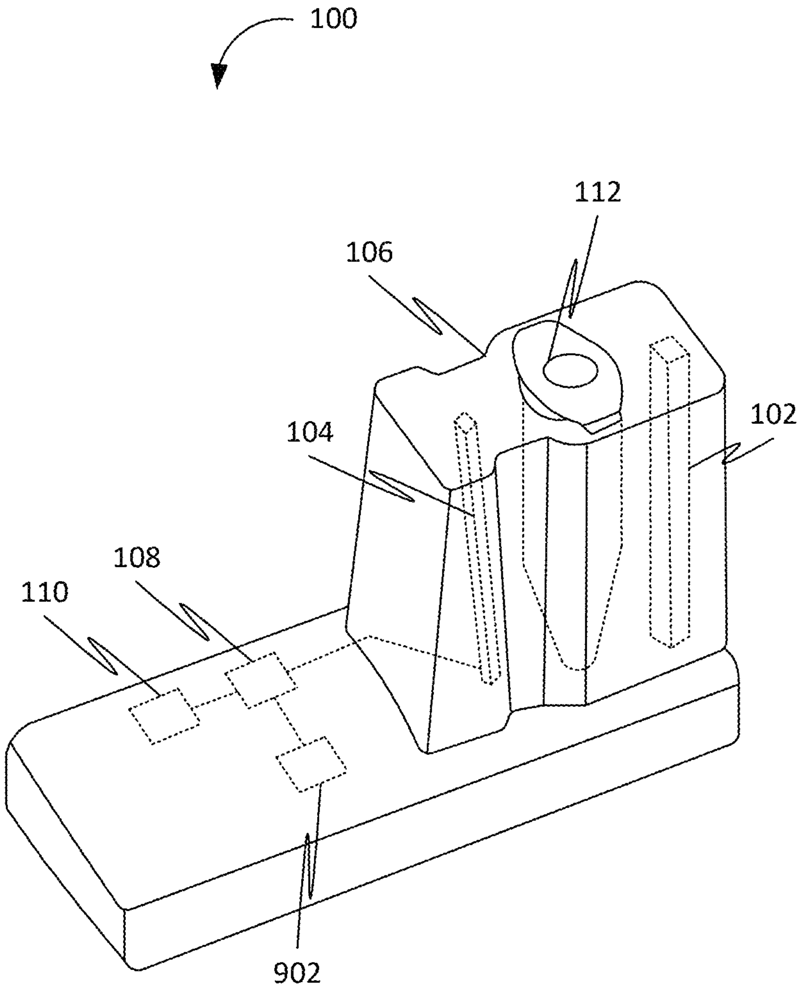
FIG. 9 is a top perspective view of the apparatus 100, in accordance with some embodiments.

In further embodiments, the apparatus 100 may include at least one first sensor 902, as shown in FIG. 9, communicatively coupled with the processing device 108. Further, the at least one first sensor 902 may be configured for detecting at least one container characteristic of the at least one container 112 comprising the at least one sample. Further, the processing device 108 may be configured for generating at least one container data of the at least one container 112 based on the detecting of the at least one container characteristic. Further, the processing device 108 may be configured for analyzing the at least one container data. Further, the determining of the at least one characteristic of the light beam may be based on the analyzing of the at least one container data. Further, the at least one first sensor 902 may include a density sensor, a transparency sensor, a temperature sensor, etc. Further, the at least one container characteristic may include a density, an optical transparency, a temperature, etc. Further, the at least one container data may include the at least one container characteristic.

In further embodiments, the apparatus 100 may include a housing 114 for the at least one lighting element 102, the at least one detecting element 104, and the at least one holding member 106. Further, each of the at least one lighting element 102, the at least one detecting element 104, and the at least one holding member 106 may be comprised in the housing 114. Further, the housing 114 may include at least one opening 116 for receiving the at least one container 112. Further, the holding of the at least one container 112 may be based on the receiving.

Further, in some embodiments, the at least one lighting element 102 may be configured for emitting a secondary light beam in a first instance. Further, the at least one container 112 may be not held between the at least one lighting element 102 and the at least one detecting element 104 in the first instance. Further, the at least one lighting element 102 may be configured for emitting the secondary light beam for irradiating a section of the at least one container 112 associated with the at least one sample in a second instance. Further, the at least one container 112 may be held between the at least one lighting element 102 and the at least one detecting element 104 in the second instance. Further, the at least one detecting element 104 may be configured for detecting the secondary light beam in the first instance based on the emitting of the secondary light beam in the first instance. Further, the at least one detecting element 104 may be configured for detecting a refracted secondary light beam produced based on the irradiating of the section of the at least one container 112 in the second instance. Further, the processing device 108 may be configured for generating a first data based on the detecting of the secondary light beam. Further, the processing device 108 may be configured for generating a second data based on the detecting of the refracted light beam. Further, the processing device 108 may be configured for analyzing the first data and the second data. Further, the processing device 108 may be configured for generating the at least one data based on the analyzing of the first data and the second data. Further, the generating of the volume measurement may be further based on the generating of the at least one data.

Figure 10:
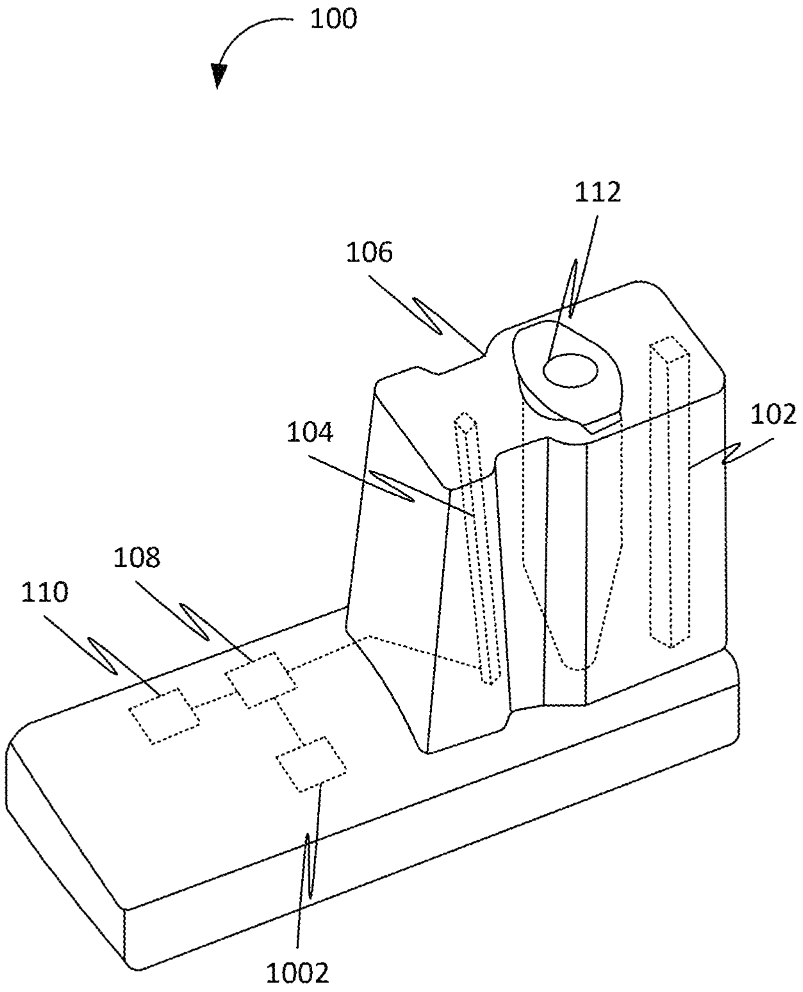
FIG. 10 is a top perspective view of the apparatus 100, in accordance with some embodiments.

In further embodiments, the apparatus 100 may include a communication device 1002, as shown in FIG. 10, communicatively coupled with the processing device 108. Further, the communication device 1002 may be configured for transmitting the volume measurement of the volume of the at least one sample to at least one external device. Further, the at least one external device may include a dispenser, a computing device, a client device, a user device, etc. Further, the communication device 1002 may employ one or more communication methods. Further, the one or more communication methods may include Inter-Integrated Circuit (I2C), Serial Peripheral Interface (SPI), RS232C, RS485, Universal Serial Bus (USB), etc. Further, the communication device 1002 may be configured for receiving a directive signal from the at least one external device. Further, the receiving of the directive signal initiates the measurement of the volume of the sample present in the container 112.

FIG. 2 is a top perspective view of the apparatus 100, in accordance with some embodiments.

FIG. 3 is a top perspective view of the apparatus 100, in accordance with some embodiments.

FIG. 4 is a top perspective view of the apparatus 100, in accordance with some embodiments.

FIG. 5 is a top perspective view of the apparatus 100, in accordance with some embodiments.

FIG. 6 is a top perspective view of the apparatus 100, in accordance with some embodiments.

FIG. 7 is a top perspective view of the apparatus 100, in accordance with some embodiments.

FIG. 8 is a top perspective view of the apparatus 100, in accordance with some embodiments.

FIG. 9 is a top perspective view of the apparatus 100, in accordance with some embodiments.

FIG. 10 is a top perspective view of the apparatus 100, in accordance with some embodiments.

Figure 11:
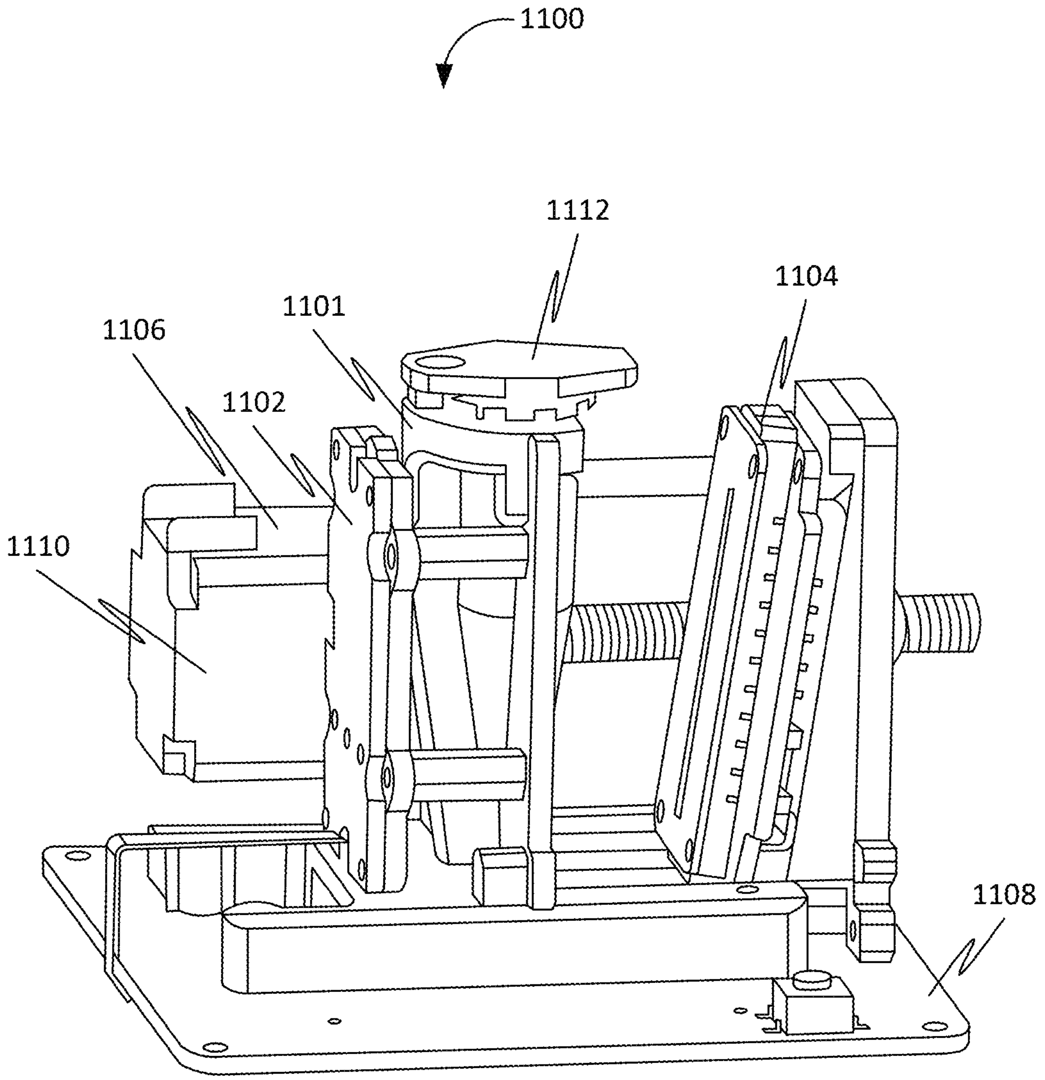
FIG. 11 is a front top perspective view of an apparatus 1100 for facilitating a measurement of a volume of a sample present in a container 1112, in accordance with some embodiments.

FIG. 11 is a front top perspective view of an apparatus 1100 for facilitating a measurement of a volume of a sample present in a container 1112, in accordance with some embodiments.

Further, the apparatus 1100 may include a holding member 1101, a light emitting device (LED) board 1102, a sensor unit 1104, a linear actuator 1106, and a printed circuit board (PCB) 1108. Further, the liner actuator 1106 may include a motor 1110.

Figure 12:
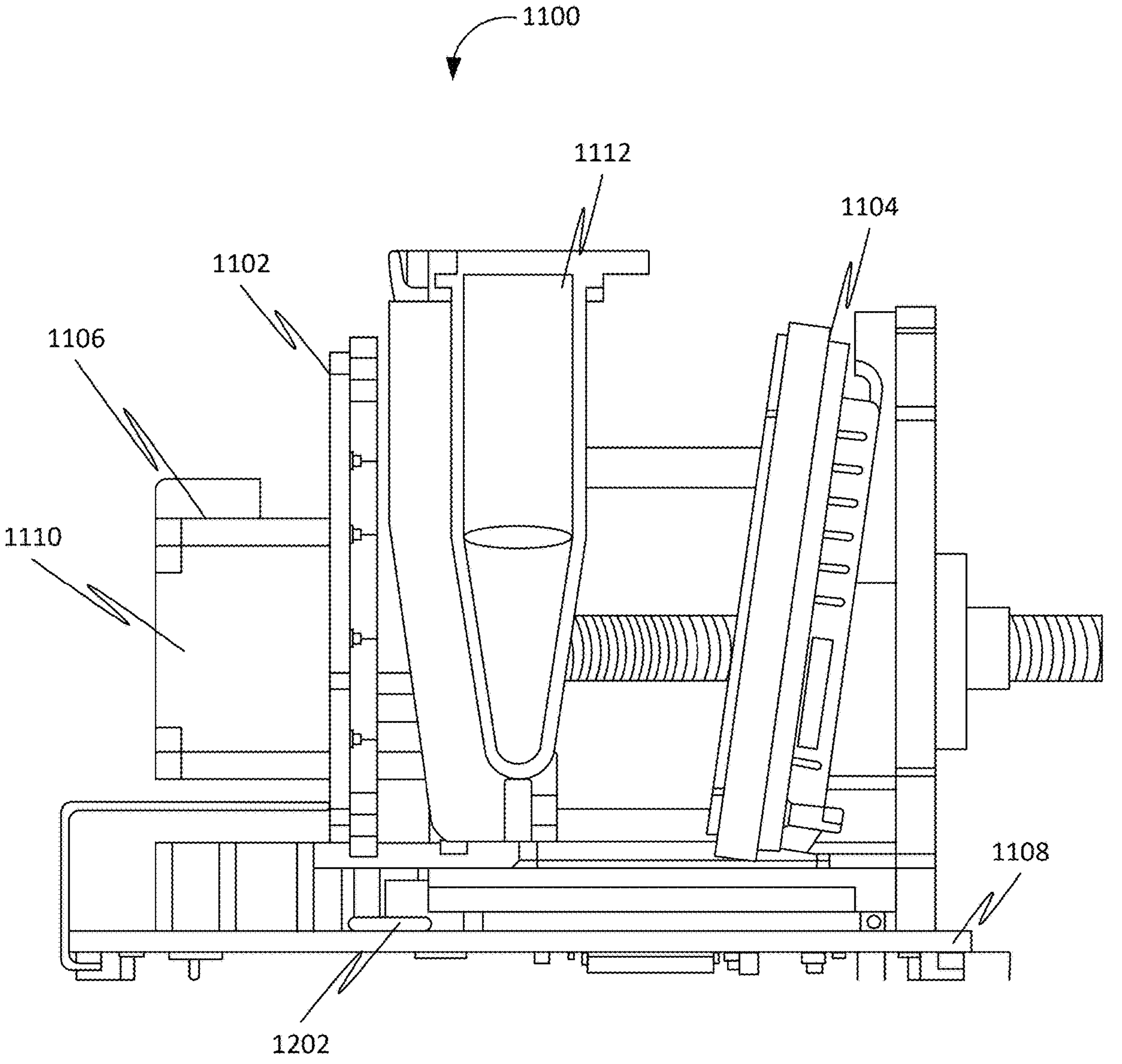
FIG. 12 is a front cross-sectional view of the apparatus 1100, in accordance with some embodiments.

FIG. 12 is a front cross-sectional view of the apparatus 1100, in accordance with some embodiments. Further, the PCB 1108 may include an encoder 1202.

Figure 13:
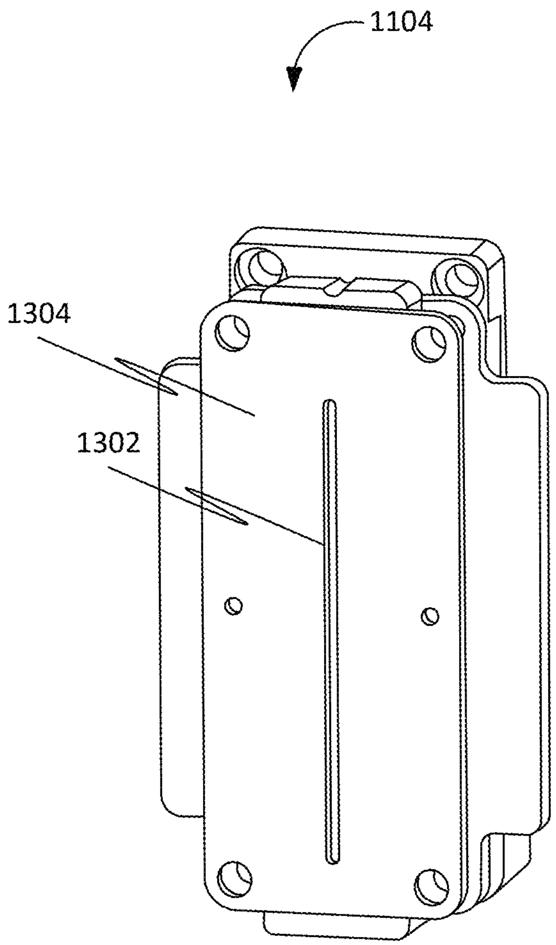
FIG. 13 is a front top perspective view of the sensor unit 1104 of the apparatus 1100, in accordance with some embodiments.

FIG. 13 is a front top perspective view of the sensor unit 1104 of the apparatus 1100, in accordance with some embodiments. Further, the sensor unit 1104 may include a slit 1302 on a front panel 1304 of the sensor unit 1104.

Figure 14:
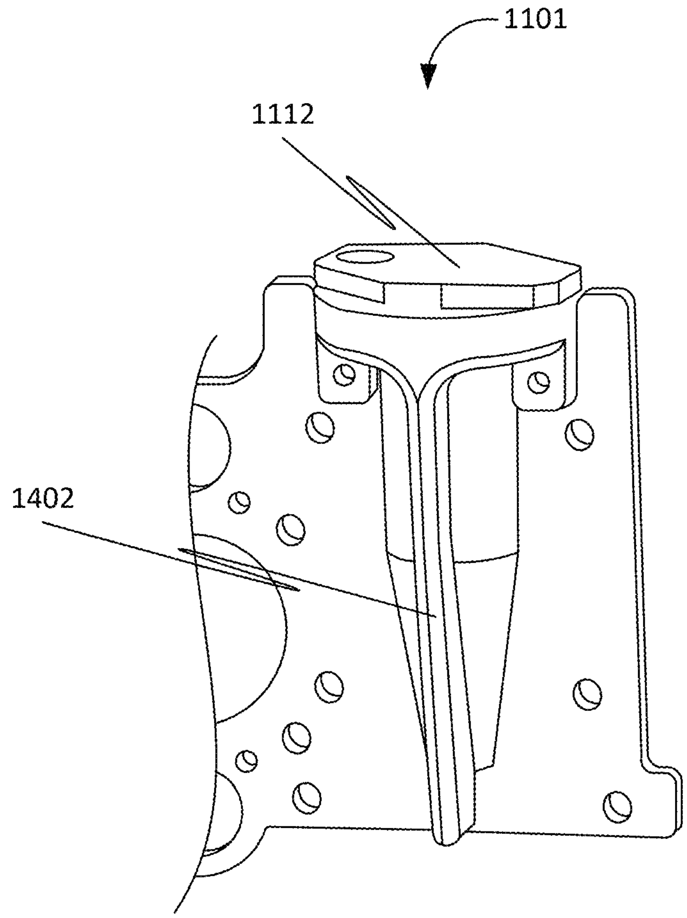
FIG. 14 is a partial front perspective view of the holding member 1101 of the apparatus 1100, in accordance with some embodiments.

FIG. 14 is a partial front perspective view of the holding member 1101 of the apparatus 1100, in accordance with some embodiments. Further, the holding member 1101 may include a shading plate 1402.

Figure 15:
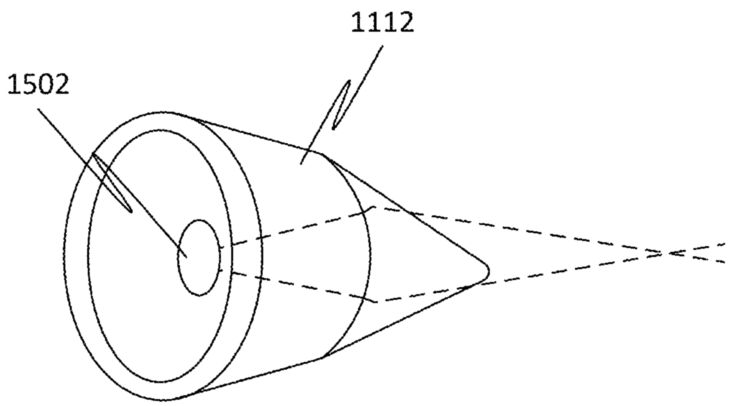
FIG. 15 illustrates a refraction of a light beam by the container 1112 comprising the sample, in accordance with some embodiments.

FIG. 15 illustrates a refraction of a light beam by the container 1112 comprising the sample, in accordance with some embodiments. Further, the LED board 1102 may include a lighting element 1502. Further, the lighting element 1502 emits the light beam for irradiating the container 1112.

Figure 16:
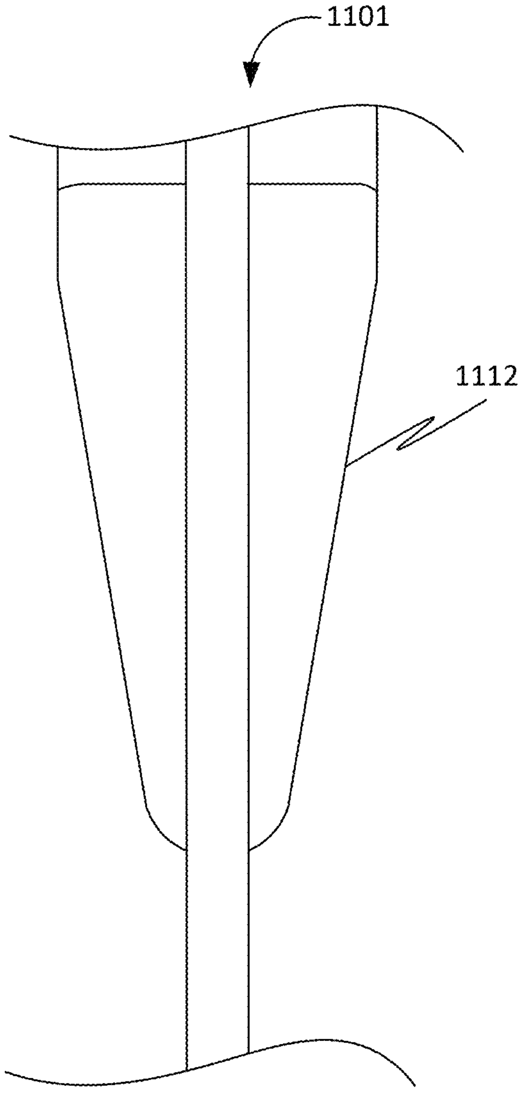
FIG. 16 is a partial front view of the holding member 1101 of the apparatus 1100, in accordance with some embodiments.

FIG. 16 is a partial front view of the holding member 1101 of the apparatus 1100, in accordance with some embodiments.

FIG. 17 illustrates a projection 1702 of light formed on a surface 1704 by a refracted light beam produced by irradiating the container 1112 comprising the sample with the light beam, in accordance with some embodiments.

Figure 18:
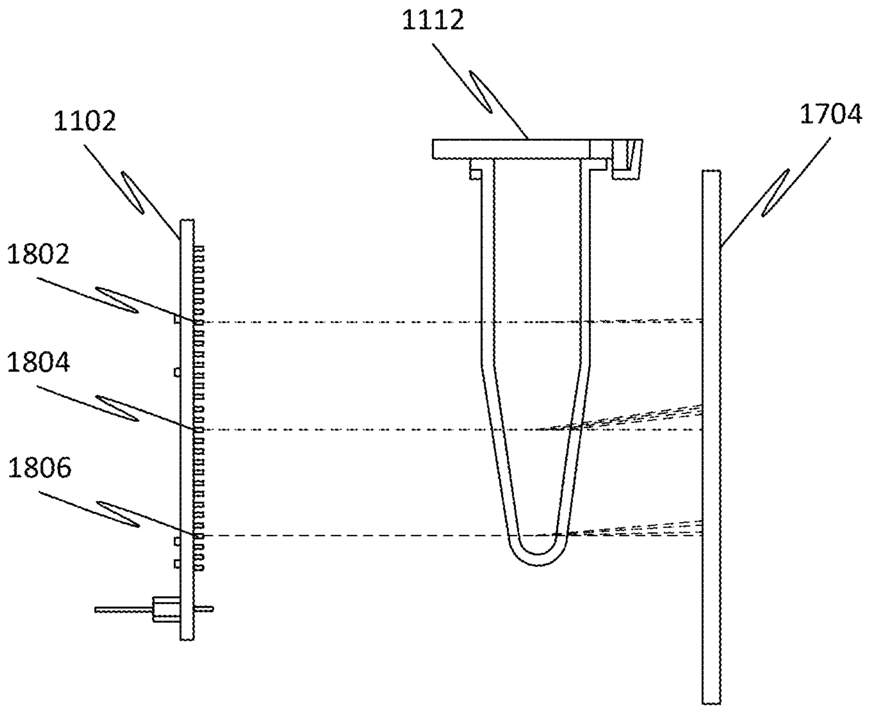
FIG. 18 illustrates irradiating the container 1112 comprising the sample using a plurality of lighting elements 1802-1806 comprised in the LED board 1102, in accordance with some embodiments.

FIG. 18 illustrates irradiating the container 1112 comprising the sample using a plurality of lighting elements 1802-1806 comprised in the LED board 1102, in accordance with some embodiments.

Figure 19:
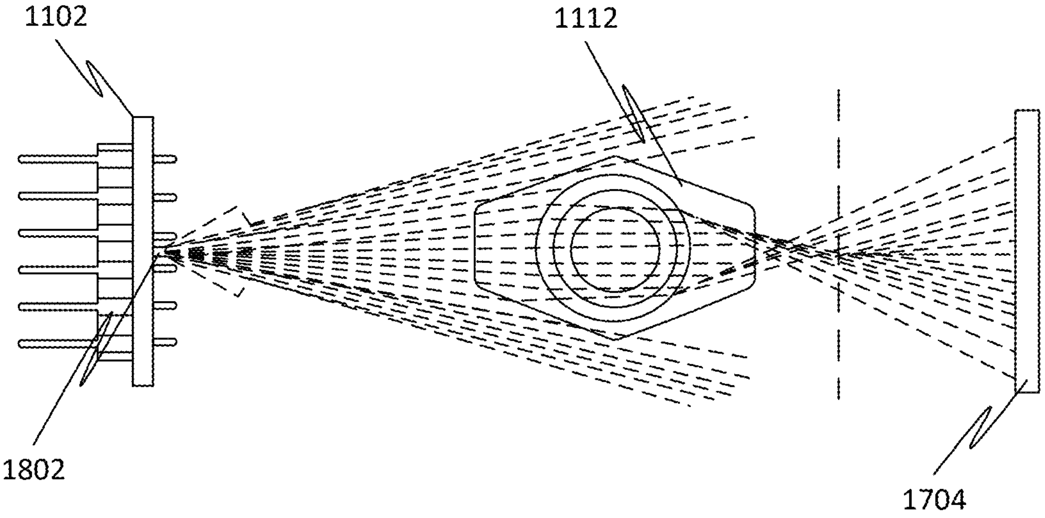
FIG. 19 illustrates irradiating the container 1112 comprising the sample using a first lighting element 1802 of the plurality of lighting elements 1802-1806 comprised in the LED board 1102, in accordance with some embodiments.

FIG. 19 illustrates irradiating the container 1112 comprising the sample using a first lighting element 1802 of the plurality of lighting elements 1802-1806 comprised in the LED board 1102, in accordance with some embodiments.

Figure 20:
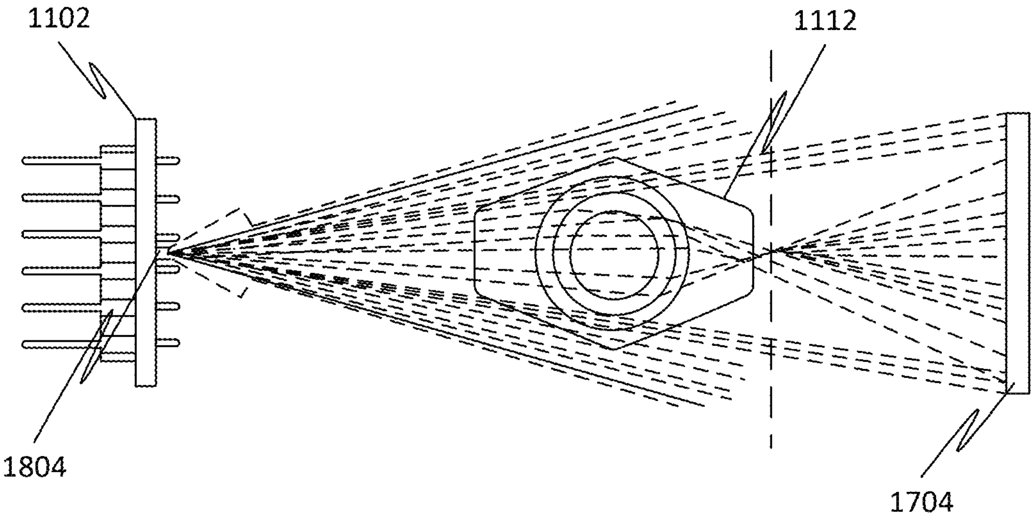
FIG. 20 illustrates irradiating the container 1112 comprising the sample using a second lighting element 1804 of the plurality of lighting elements 1802-1806 comprised in the LED board 1102, in accordance with some embodiments.

FIG. 20 illustrates irradiating the container 1112 comprising the sample using a second lighting element 1804 of the plurality of lighting elements 1802-1806 comprised in the LED board 1102, in accordance with some embodiments.

Figure 21:
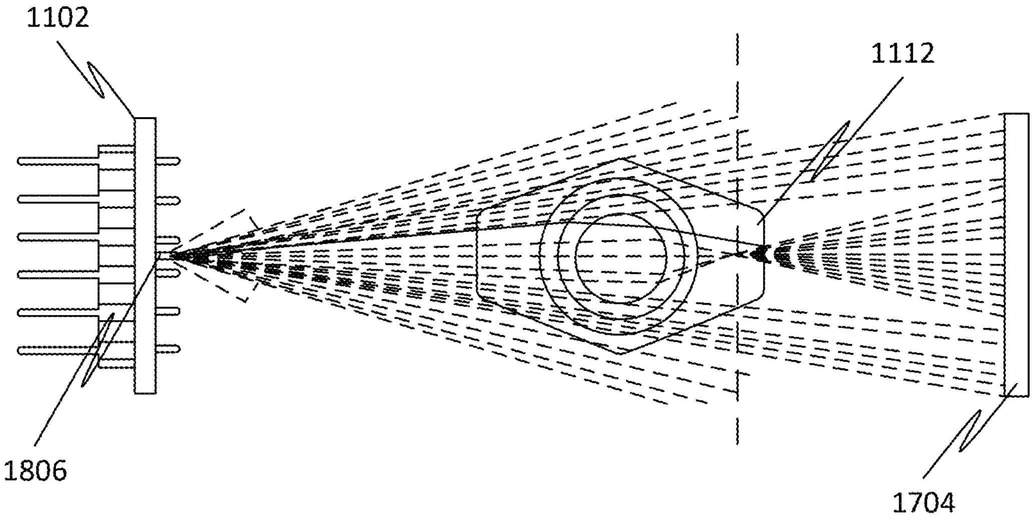
FIG. 21 illustrates irradiating the container 1112 comprising the sample with a third lighting element 1806 of the plurality of lighting elements 1802-1806 comprised in the LED board 1102, in accordance with some embodiments.

FIG. 21 illustrates irradiating the container 1112 comprising the sample with a third lighting element 1806 of the plurality of lighting elements 1802-1806 comprised in the LED board 1102, in accordance with some embodiments.

FIG. 22 is a front view of the container 1112, in accordance with some embodiments.

Figure 23:
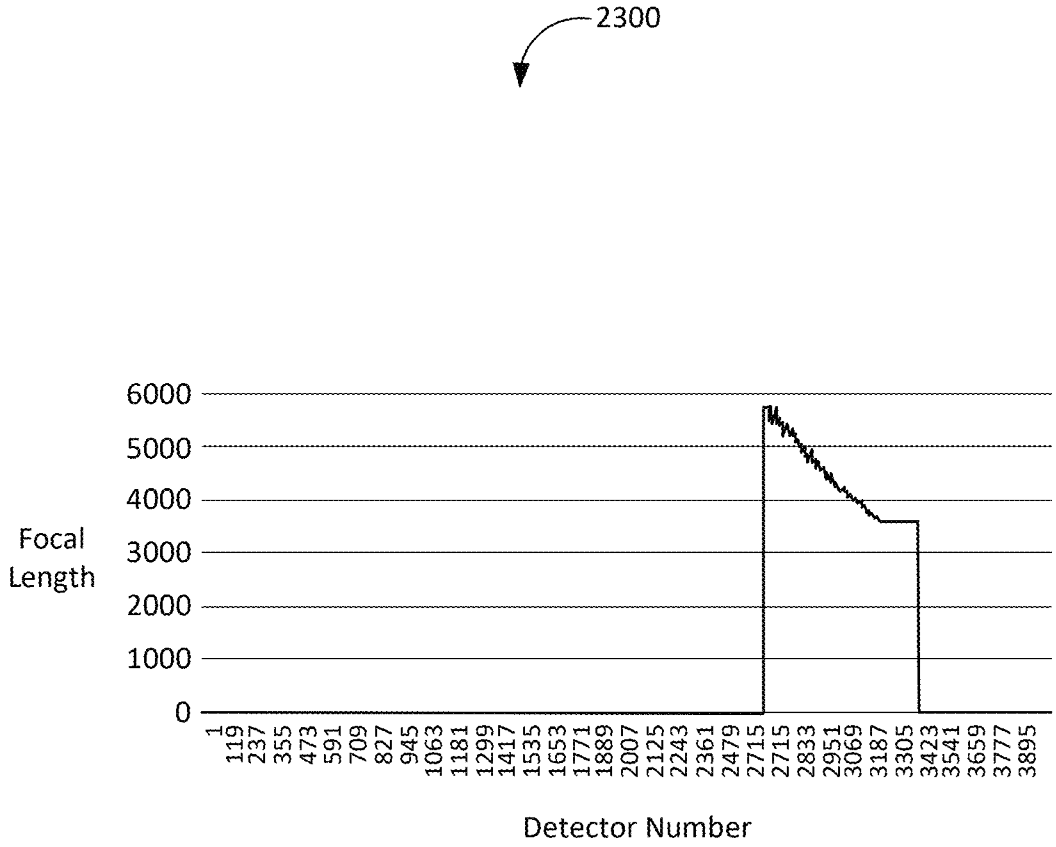
FIG. 23 illustrates a graph 2300 of a focal length versus a detector number based on a measurement data obtained by the measurement of the volume of the sample, in accordance with some embodiments.

FIG. 23 illustrates a graph 2300 of a focal length versus a detector number based on a measurement data obtained by the measurement of the volume of the sample, in accordance with some embodiments.

Figure 24:
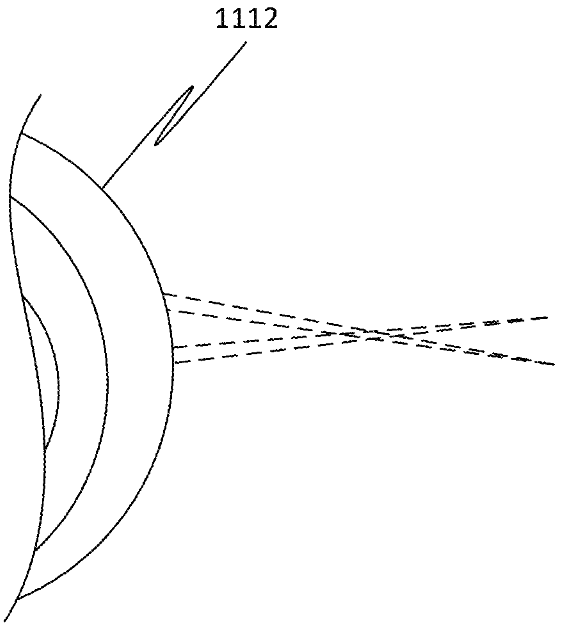
FIG. 24 illustrates converging of the refracted light beam based on irradiating the container 1112 comprising the sample with the light beam using the shading plate 1402, in accordance with some embodiments.

FIG. 24 illustrates converging of the refracted light beam based on irradiating the container 1112 comprising the sample with the light beam using the shading plate 1402, in accordance with some embodiments.

Figure 25:
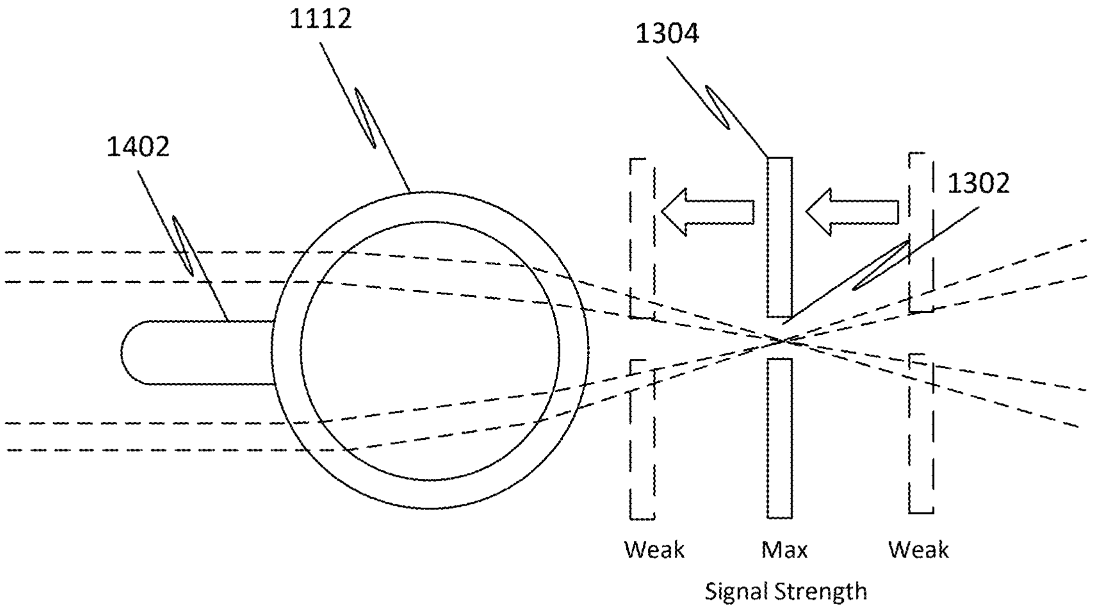
FIG. 25 illustrates passing of the refracted light beam through the slit based on irradiating the container 1112 comprising the sample with the light beam using the shading plate 1402, in accordance with some embodiments.

FIG. 25 illustrates passing of the refracted light beam through the slit based on irradiating the container 1112 comprising the sample with the light beam using the shading plate 1402, in accordance with some embodiments.

Figure 26:
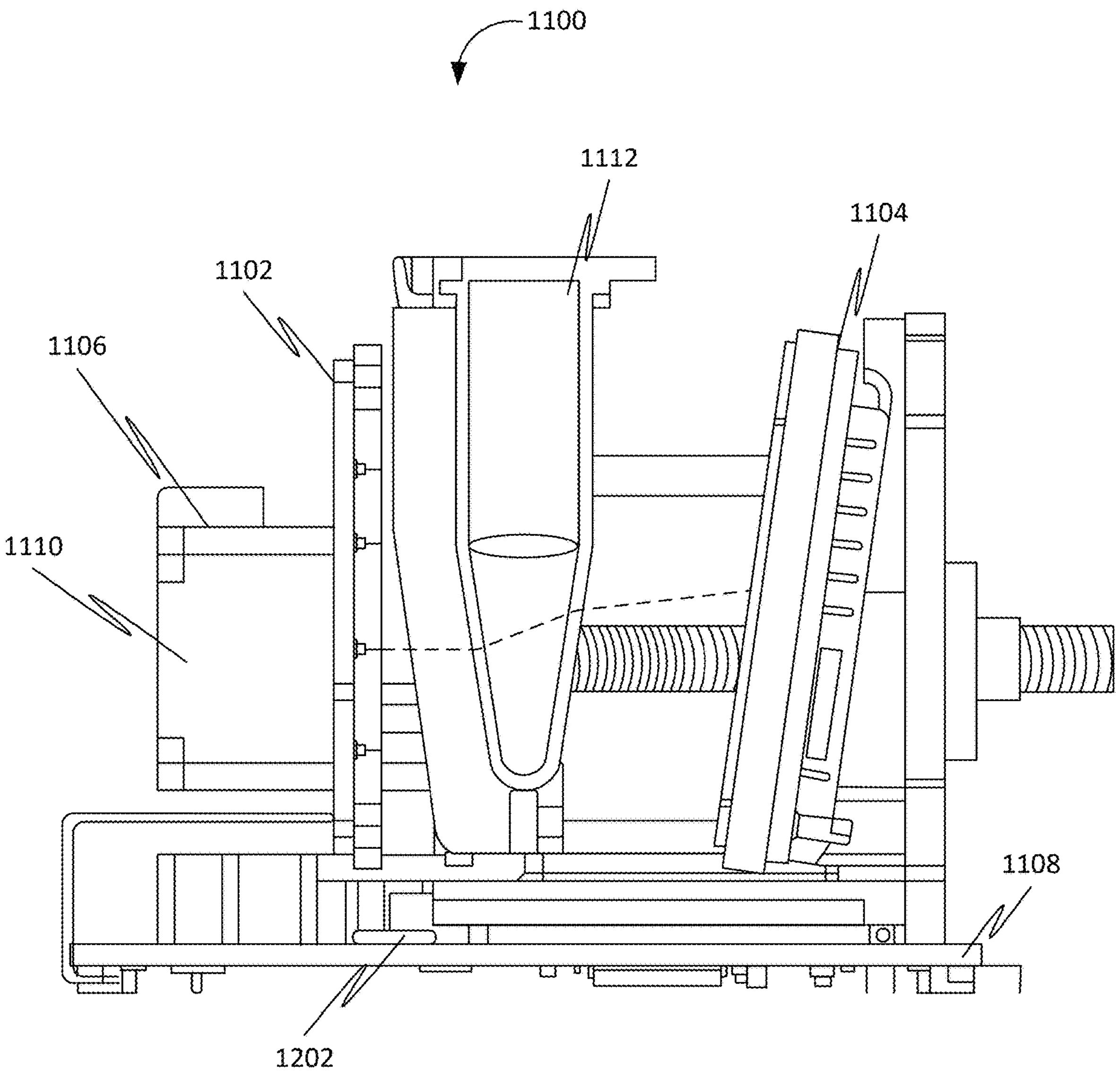
FIG. 26 illustrates refraction of a light ray through the container 1112 comprising the sample, in accordance with some embodiments.

FIG. 26 illustrates refraction of a light ray through the container 1112 comprising the sample, in accordance with some embodiments.

FIG. 27 illustrates a propagation of a light ray refracting based on the container 1112, in accordance with some embodiments.

FIG. 28 illustrates a graph 2800 of a Delta $\theta_5$ versus a refractive index for the sample, in accordance with some embodiments.

FIG. 29 illustrates a graph 2900 of a Delta $\theta_5$ versus a refractive index for the sample, in accordance with some embodiments.

Figure 30:
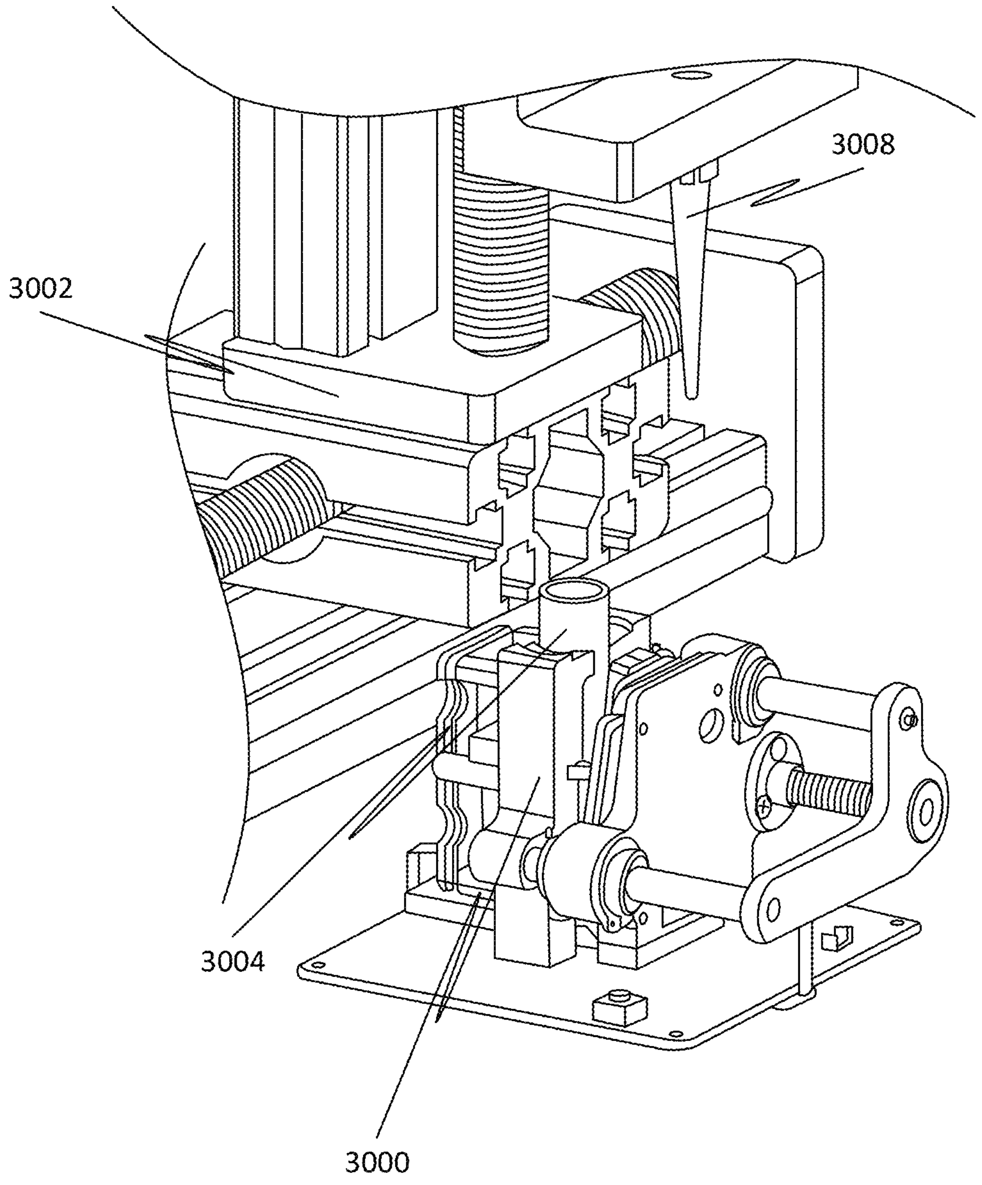
FIG. 30 is a perspective view of an apparatus 3000 for facilitating a measurement of a volume of a sample present in a container 3004 with a dispenser 3002, in accordance with some embodiments.

FIG. 30 is a perspective view of an apparatus 3000 for facilitating a measurement of a volume of a sample present in a container 3004 with a dispenser 3002, in accordance with some embodiments.

Further, the dispenser 3002 aspires an aspired volume of the sample from the container 3004 comprising the sample. Further, the dispenser 3002 aspires the aspired volume of the sample from the container 3004 through a nozzle 3008 comprised in the dispenser 3002. Further, the apparatus 3000 may feedback an actual aspired volume by the dispenser 3002 to the dispenser 3002 based on the measurement of the volume of the sample present in the container. Further, the aspired volume aspired by the dispenser 3002 may differ from the actual aspired volume due to air bubbles that may be aspired by the nozzle 3008 while aspiring the aspired volume of the sample.

Figure 31:
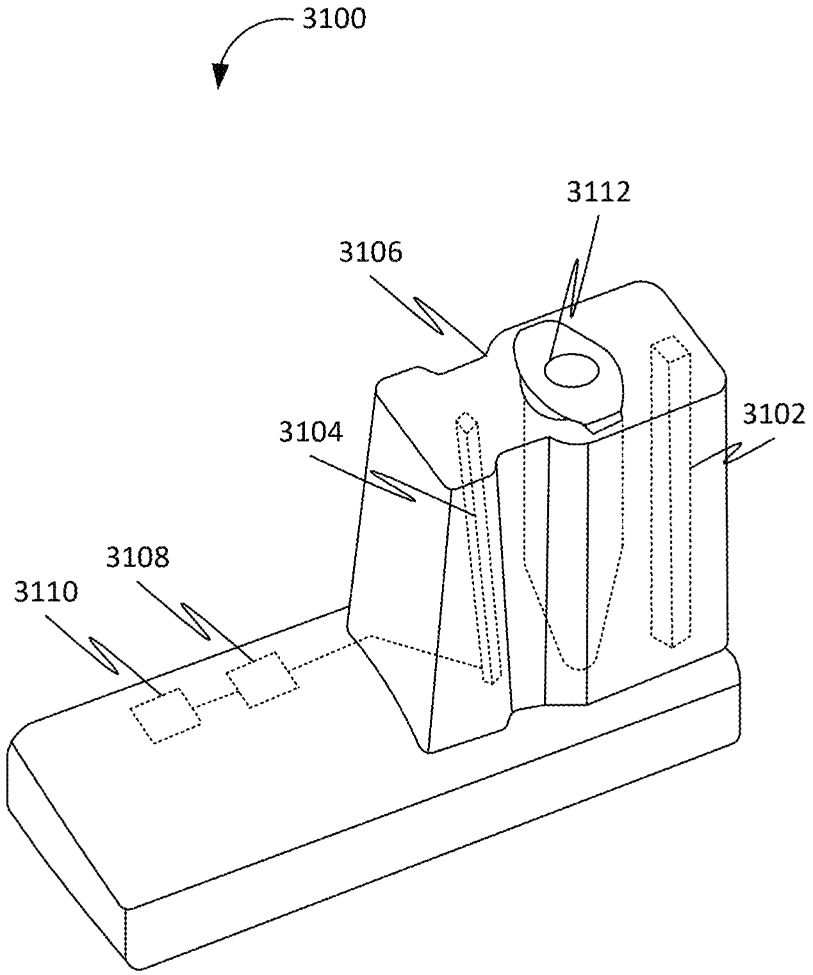
FIG. 31 is a top perspective view of an apparatus 3100 for facilitating a measurement of a volume of a sample present in a container, in accordance with some embodiments.

FIG. 31 is a top perspective view of an apparatus 3100 for facilitating a measurement of a volume of a sample present in a container, in accordance with some embodiments. Accordingly, the apparatus 3100 may include at least one lighting element 3102, at least one detecting element 3104, at least one holding member 3106, a processing device 3108, and a storage device 3110.

Further, the at least one detecting element 3104 may be spaced apart from the at least one lighting element 3102. Further, the at least one detecting element 3104 may be aligned with the at least one lighting element 3102.

Further, the at least one holding member 3106 may be configured for holding at least one container 3112 comprising at least one sample between the at least one lighting element 3102 and the at least one detecting element 3104. Further, the at least one lighting element 3102 may be configured for emitting a light beam for irradiating the at least one container 3112 from a first side of the at least one container 3112 with the light beam. Further, the at least one detecting element 3104 may be configured for detecting a light intensity of a refracted light beam produced based on the irradiating of the at least one container 3112 from the first side with the light beam, from a second side of the at least one container 3112. Further, the second side opposes the first side. Further, the detecting of the light intensity of the refracted light beam may include detecting a plurality of positional light intensities of the refracted light beam at a plurality of positions along a path associated with the refracted light beam.

Further, the processing device 3108 may be communicatively coupled with the at least one detecting element 3104. Further, the processing device 3108 may be configured for generating a light intensity data associated with the light intensity of the refracted light beam based on the detecting. Further, the generating of the light intensity data may be further based on the detecting of the plurality of positional light intensities. Further, the light intensity data may include a plurality of positional light intensity data associated with the plurality of positional light intensities of the refracted light beam at the plurality of positions along the path of the refracted light beam. Further, the processing device 3108 may be configured for analyzing the light intensity data. Further, the processing device 3108 may be configured for generating a volume measurement of the volume of the at least one sample comprised in the at least one container 3112 based on the analyzing of the light intensity data and at least one data.

Further, the storage device 3110 may be communicatively coupled with the processing device 3108. Further, the storage device 3110 may be configured for storing the volume measurement.

Further, in some embodiments, the processing device 3108 may be configured for identifying a first position from the plurality of positions based on the analyzing. Further, a first positional light intensity of the refracted light beam at the first position may be maximum among the plurality of positional light intensities. Further, the processing device 3108 may be configured for generating a first position data for the first position based on the identifying of the first position. Further, the generating of the volume measurement may be further based on the first position data.

Figure 32:
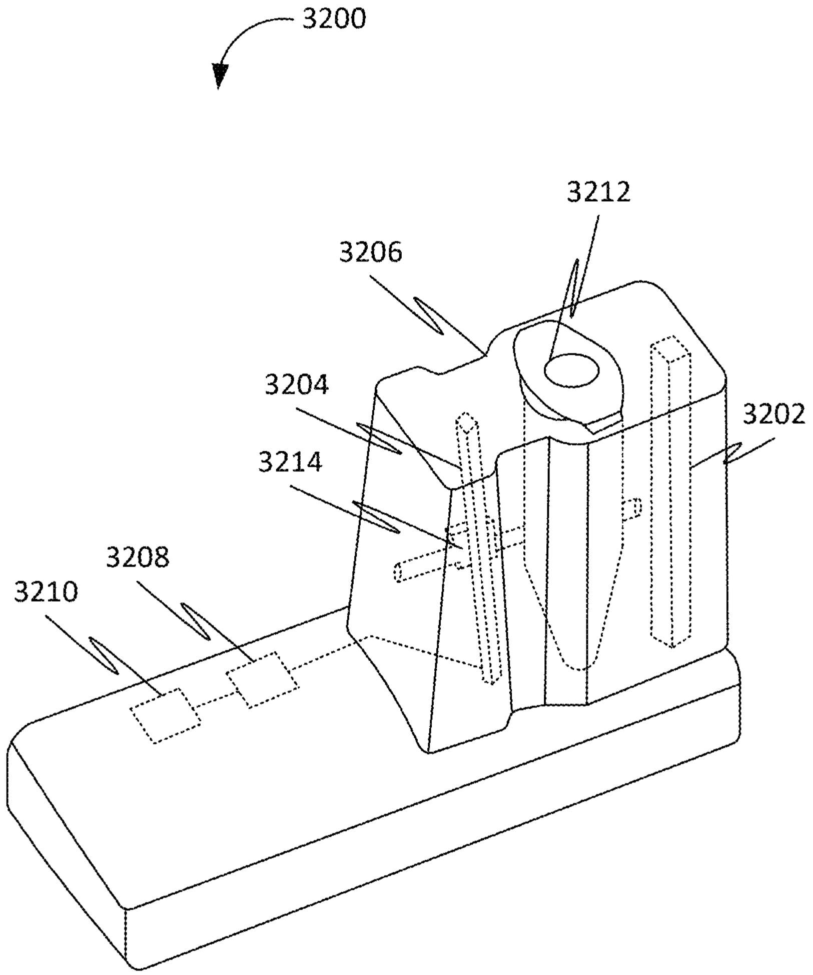
FIG. 32 is a top perspective view of an apparatus 3200 for facilitating a measurement of a volume of a sample present in a container, in accordance with some embodiments.

FIG. 32 is a top perspective view of an apparatus 3200 for facilitating a measurement of a volume of a sample present in a container, in accordance with some embodiments. Accordingly, the apparatus 3200 may include at least one lighting element 3202, at least one detecting element 3204, at least one holding member 3206, a processing device 3208, a storage device 3210, and at least one movement assembly 3214.

Further, the at least one detecting element 3204 may be spaced apart from the at least one lighting element 3202. Further, the at least one detecting element 3204 may be aligned with the at least one lighting element 3202.

Further, the at least one holding member 3206 may be configured for holding at least one container 3212 comprising at least one sample between the at least one lighting element 3202 and the at least one detecting element 3204. Further, the at least one lighting element 3202 may be configured for emitting a light beam for irradiating the at least one container 3212 from a first side of the at least one container 3212 with the light beam. Further, the at least one detecting element 3204 may be configured for detecting a light intensity of a refracted light beam produced based on the irradiating of the at least one container 3212 from the first side with the light beam, from a second side of the at least one container 3212. Further, the second side opposes the first side. Further, the detecting of the light intensity of the refracted light beam may include detecting a plurality of positional light intensities of the refracted light beam at a plurality of positions along a path associated with the refracted light beam.

Further, the processing device 3208 may be communicatively coupled with the at least one detecting element 3204. Further, the processing device 3208 may be configured for generating a light intensity data associated with the light intensity of the refracted light beam based on the detecting. Further, the generating of the light intensity data may be further based on the detecting of the plurality of positional light intensities. Further, the light intensity data may include a plurality of positional light intensity data associated with the plurality of positional light intensities of the refracted light beam at the plurality of positions along the path of the refracted light beam. Further, the processing device 3208 may be configured for analyzing the light intensity data. Further, the processing device 3208 may be configured for generating a volume measurement of the volume of the at least one sample comprised in the at least one container 3212 based on the analyzing of the light intensity data and at least one data.

Further, the storage device 3210 may be communicatively coupled with the processing device 3208. Further, the storage device 3210 may be configured for storing the volume measurement.

Further, the at least one movement assembly 3214 may be coupled with the at least one detecting element 3204. Further, the at least one movement assembly 3214 may be configured for moving the at least one detecting element 3204 in relation to the at least one lighting element 3202 for transitioning the at least one detecting element 3204 between the plurality of positions. Further, the detecting of the plurality of positional light intensities of the refracted light beam at the plurality of positions along the path of the refracted light beam may be further based on the transitioning.

Figure 33:
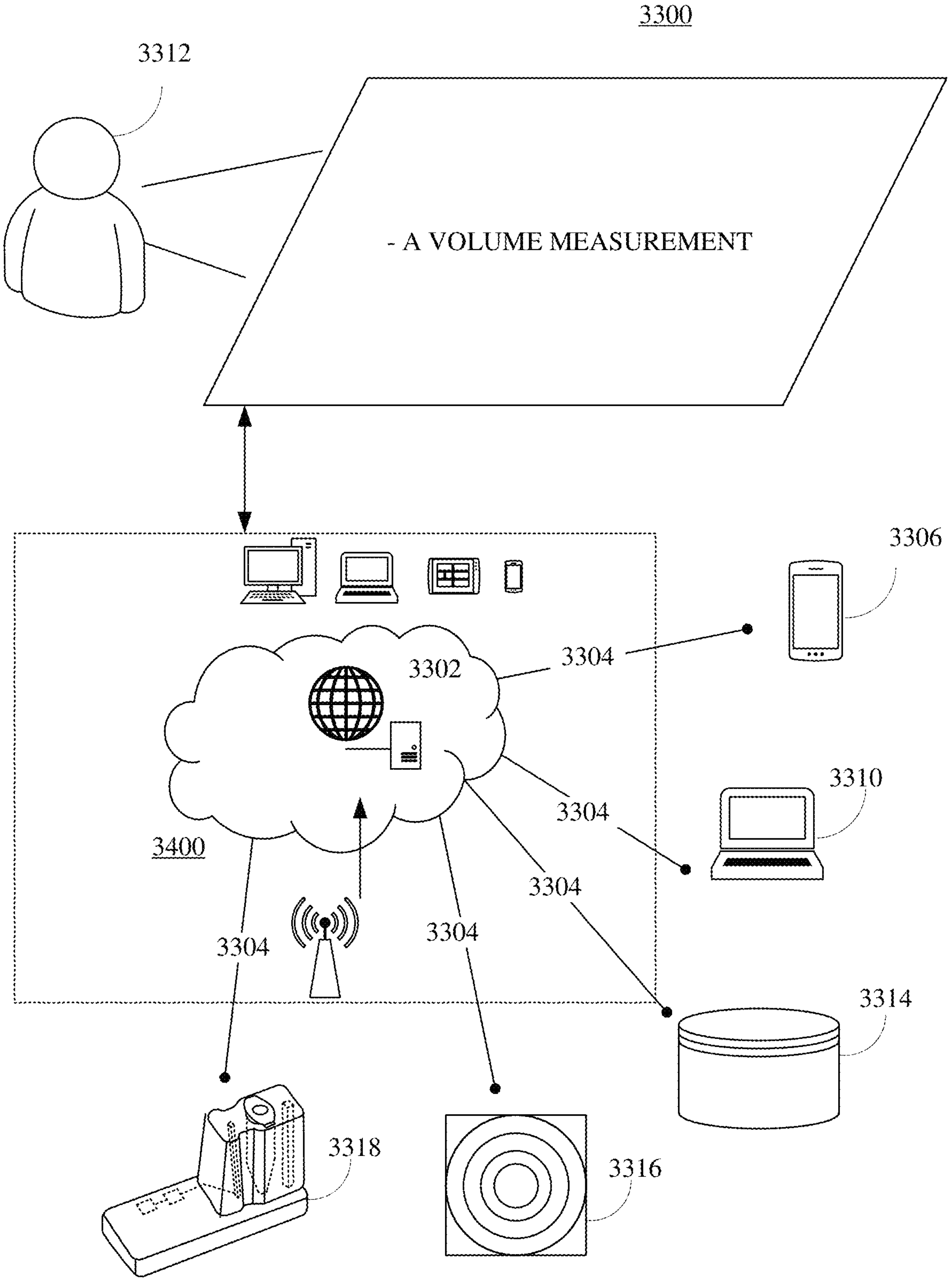
FIG. 33 is an illustration of an online platform 3300 consistent with various embodiments of the present disclosure.

FIG. 33 is an illustration of an online platform 3300 consistent with various embodiments of the present disclosure. By way of non-limiting example, the online platform 3300 to facilitate a measurement of a volume of a sample present in a container may be hosted on a centralized server 3302, such as, for example, a cloud computing service. The centralized server 3302 may communicate with other network entities, such as, for example, a mobile device 3306 (such as a smartphone, a laptop, a tablet computer, etc.), other electronic devices 3310 (such as desktop computers, server computers, etc.), databases 3314, sensors 3316, and an apparatus 3318 (such as the apparatus 100, the apparatus 1100, the apparatus 3000, the apparatus 3100, the apparatus 3200, the apparatus 3500, etc.) over a communication network 3304, such as, but not limited to, the Internet. Further, users of the online platform 3300 may include relevant parties such as, but not limited to, end-users, administrators, service providers, service consumers, and so on. Accordingly, in some instances, electronic devices operated by the one or more relevant parties may be in communication with the platform.

A user 3312, such as the one or more relevant parties, may access online platform 3300 through a web based software application or browser. The web based software application may be embodied as, for example, but not be limited to, a website, a web application, a desktop application, and a mobile application compatible with a computing device 3400.

Figure 34:
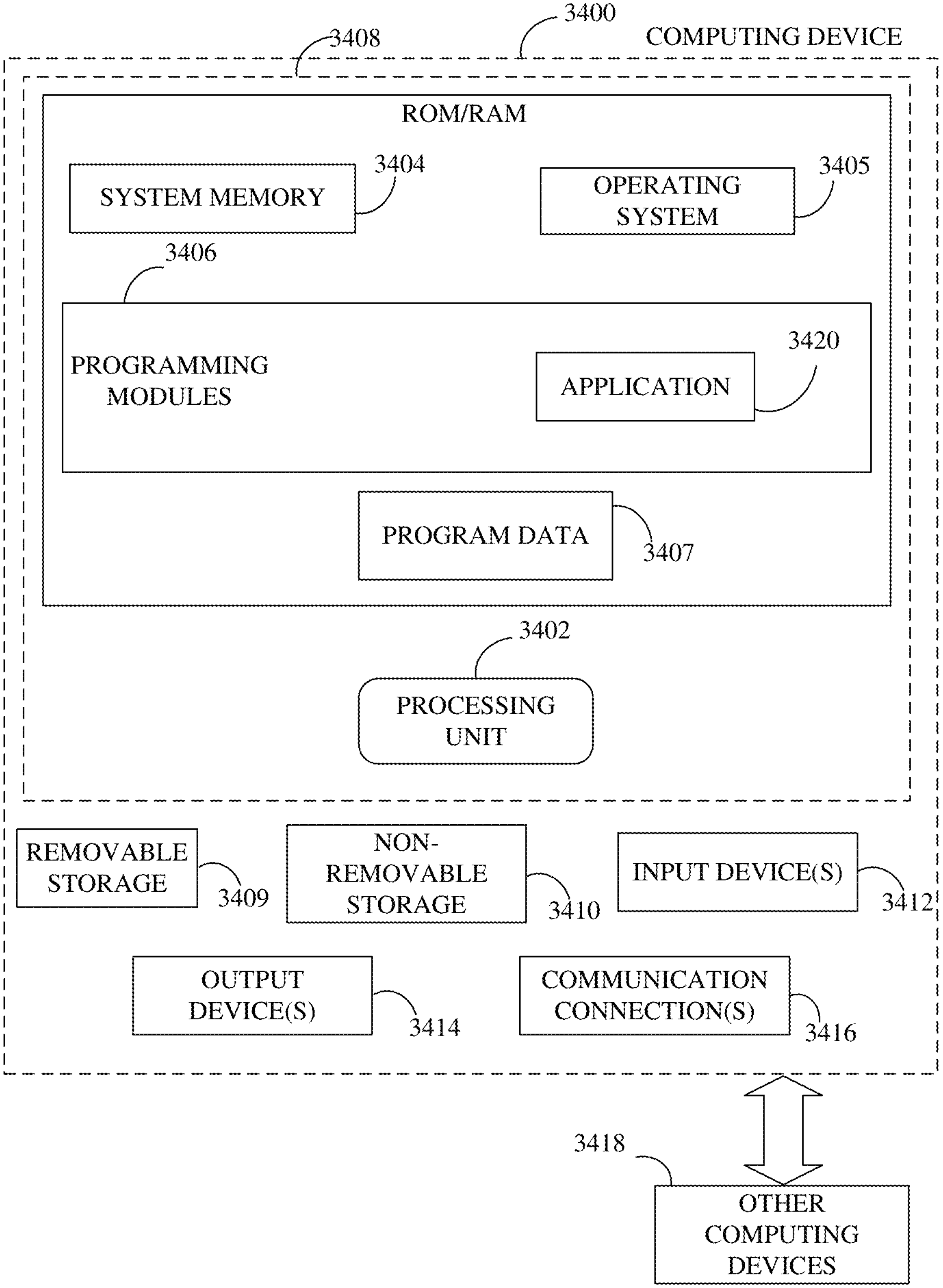
FIG. 34 is a block diagram of a computing device 3400 for implementing the methods disclosed herein, in accordance with some embodiments.

With reference to FIG. 34, a system consistent with an embodiment of the disclosure may include a computing device or cloud service, such as computing device 3400. In a basic configuration, computing device 3400 may include at least one processing unit 3402 and a system memory 3404. Depending on the configuration and type of computing device, system memory 3404 may comprise, but is not limited to, volatile (e.g. random-access memory (RAM)), non-volatile (e.g. read-only memory (ROM)), flash memory, or any combination. System memory 3404 may include operating system 3405, one or more programming modules 3406, and may include a program data 3407. Operating system 3405, for example, may be suitable for controlling computing device 3400's operation. In one embodiment, programming modules 3406 may include image-processing modules, machine learning modules, etc. Furthermore, embodiments of the disclosure may be practiced in conjunction with a graphics library, other operating systems, or any other application program and is not limited to any particular application or system. This basic configuration is illustrated in FIG. 34 by those components within a dashed line 3408.

Computing device 3400 may have additional features or functionality. For example, computing device 3400 may also include additional data storage devices (removable and/or non-removable) such as, for example, magnetic disks, optical disks, or tape. Such additional storage is illustrated in FIG. 34 by a removable storage 3409 and a non-removable storage 3410. Computer storage media may include volatile and non-volatile, removable, and non-removable media implemented in any method or technology for storage of information, such as computer-readable instructions, data structures, program modules, or other data. System memory 3404, removable storage 3409, and non-removable storage 3410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), other optical storage, magnetic cassettes, magnetic tape, magnetic disk storage or other magnetic storage devices, or any other medium which can be used to store information and which can be accessed by computing device 3400. Any such computer storage media may be part of device 3400. Computing device 3400 may also have input device(s) 3412 such as a keyboard, a mouse, a pen, a sound input device, a touch input device, a location sensor, a camera, a biometric sensor, etc. Output device(s) 3414 such as a display, speakers, a printer, etc. may also be included. The aforementioned devices are examples and others may be used.

Computing device 3400 may also contain a communication connection 3416 that may allow device 3400 to communicate with other computing devices 3418, such as over a network in a distributed computing environment, for example, an intranet or the Internet. Communication connection 3416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3404, including operating system 3405. While executing on processing unit 3402, programming modules 3406 (e.g., application 3420 such as a media player) may perform processes including, for example, one or more stages of methods, algorithms, systems, applications, servers, databases as described above. The aforementioned process is an example, and processing unit 3402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 35:
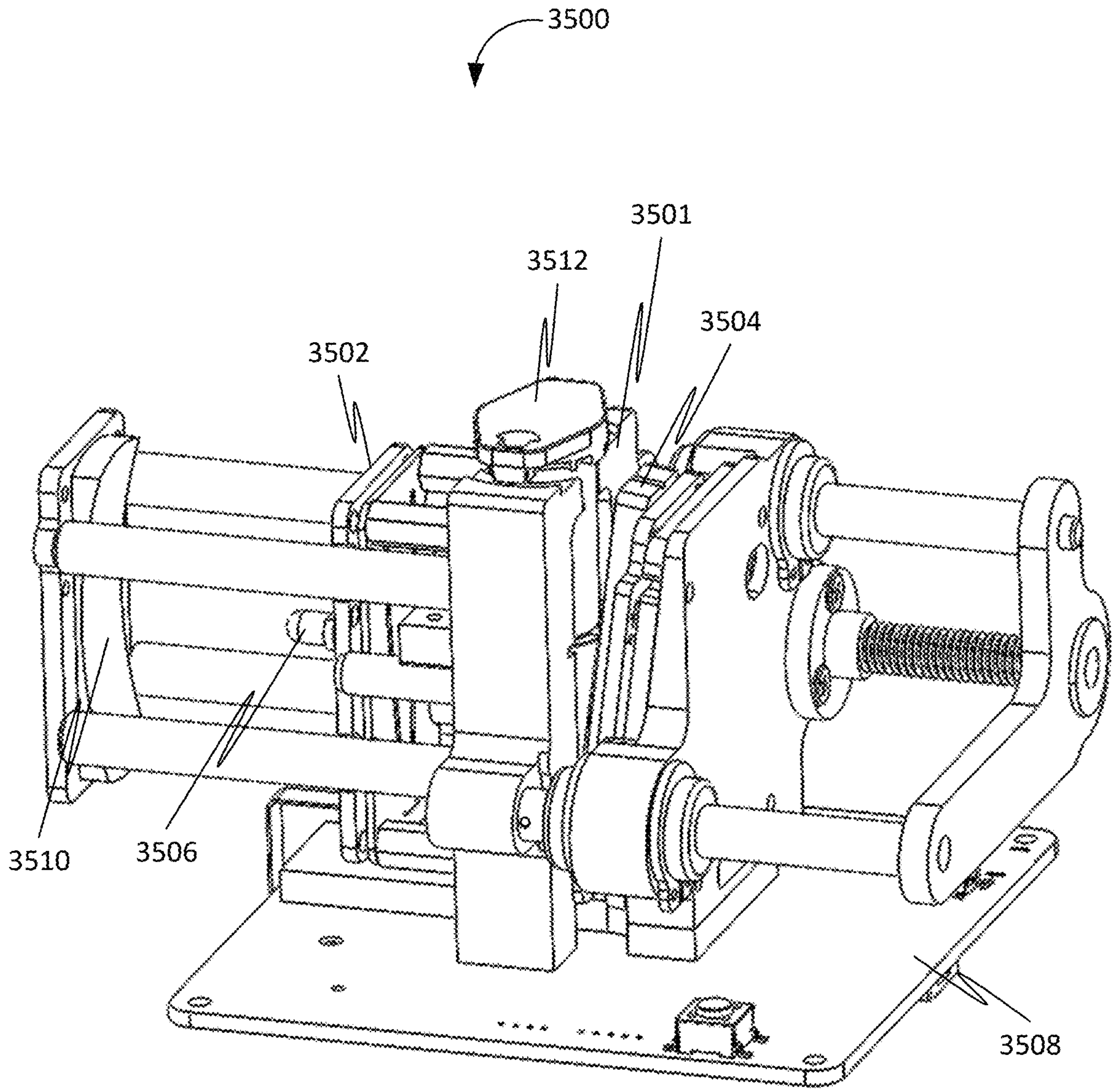
FIG. 35 is a top perspective view of an apparatus 3500 for facilitating a measurement of a volume of a sample present in a container 3512, in accordance with some embodiments.

FIG. 35 is a top perspective view of an apparatus 3500 for facilitating a measurement of a volume of a sample present in a container 3512, in accordance with some embodiments.

Figure 36:
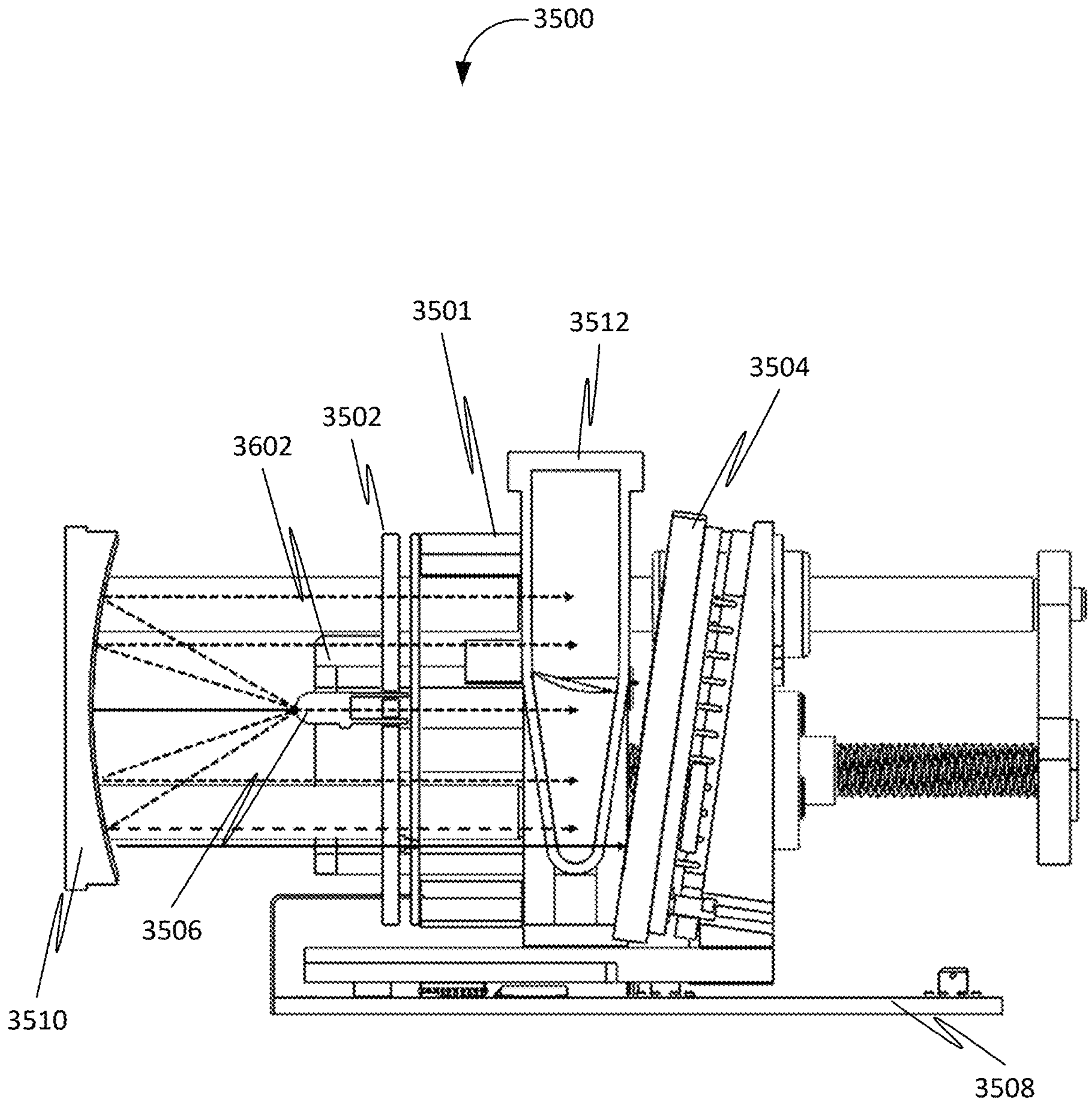
FIG. 36 is a front cross-sectional view of the apparatus 3500, in accordance with some embodiments.

Further, the apparatus 3500 may include a holding member 3501, a light emitting device (LED) board 3502, a sensor unit 3504, a linear actuator 3602 (as shown in FIG. 36), a printed circuit board (PCB) 3508, and a reflection collimator 3510. Further, the reflection collimator 3510 may be coupled to the holding member 3501. Further, the LED board 3502 may include a lighting device 3506. Further, the lighting device 3506 may be a single light source. Further, the single light source may emit a plurality of divergent light beams toward the reflection collimator 3510. Further, the reflection collimator 3510 may collimate the plurality of divergent light beams for producing a plurality of parallel and/or collimated light beams directed toward the container 3512. Further, the producing of the plurality of parallel and/or collimated light beams enables the single light source to cover a vertical irradiation area of the container 3512 and the sensor unit 3504.

FIG. 36 is a front cross-sectional view of the apparatus 3500, in accordance with some embodiments. FIG. 36 illustrates ray trajectories of light rays produced by the single light source and reflected by the reflection collimator 3510.

Although the present disclosure has been explained in relation to its preferred embodiment, it is to be understood that many other possible modifications and variations can be made without departing from the spirit and scope of the disclosure.

What is claimed is:

1. An apparatus for facilitating a measurement of a volume of a sample present in a container, the apparatus comprising:

at least one lighting element;

at least one detecting element spaced apart from the at least one lighting element, wherein the at least one detecting element is aligned with the at least one lighting element;

at least one holding member configured for holding at least one container comprising at least one sample between the at least one lighting element and the at least one detecting element, wherein the at least one lighting element is configured for emitting a light beam for irradiating the at least one container from a first side of the at least one container with the light beam, wherein the light beam comprises a parallel light beam, wherein the irradiating of the at least one container from the first side with the light beam comprises irradiating a first side region of the at least one container with a first light beam portion of the light beam and a second side region of the at least one container with a second light beam portion of the light beam while preventing an irradiation of a central region of the at least one container, wherein the first side region opposes the second side region, wherein the at least one detecting element is configured for detecting a light intensity of a refracted light beam produced based on the irradiating of the at least one container from the first side with the light beam, from a second side of the at least one container, wherein the second side opposes the first side;

a processing device communicatively coupled with the at least one detecting element, wherein the processing device is configured for:

generating a light intensity data associated with the light intensity of the refracted light beam based on the detecting;

analyzing the light intensity data; and generating a volume measurement of the volume of the at least one sample comprised in the at least one container based on the analyzing of the light intensity data and at least one data; and a storage device communicatively coupled with the processing device, wherein the storage device is configured for storing the volume measurement.

2. The apparatus of claim 1, wherein the at least one lighting element comprises a plurality of lighting elements, wherein the plurality of lighting elements are vertically arranged, wherein the plurality of lighting elements is configured for emitting a plurality of light beams for irradiating a plurality of sections of the at least one container from the first side of the at least one container, wherein the emitting of the light beam for the irradiating of the at least one container from the first side of the at least one container comprises the emitting of the plurality of light beams for the irradiating of the plurality of sections of the at least one container from the first side of the at least one container.

3. The apparatus of claim 1, wherein the at least one detecting element comprises a plurality of detecting elements, wherein the plurality of detecting elements are vertically arranged, wherein the irradiating of the at least one container from the first side of the at least one container with the light beam comprises irradiating a plurality of sections of the at least one container from the first side of the at least one container with a plurality of light beams, wherein the plurality of detecting elements is configured for detecting a plurality of light intensities of a plurality of refracted light beams produced based on the irradiating of the plurality of sections from the first side with the plurality of light beams, from the second side of the at least one container, wherein the detecting of the light intensity of the refracted light beam produced based on the irradiating of the at least one container from the first side with the light beam comprises the detecting of the plurality of light intensities of the plurality of refracted light beams produced based on the irradiating of the plurality of sections from the first side with the plurality of light beams, from the second side of the at least one container.

4. The apparatus of claim 1, wherein the light intensity of the refracted light beam varies along a path of the refracted light beam, wherein the detecting of the light intensity of the refracted light beam comprises detecting a plurality of positional light intensities of the refracted light beam at a plurality of positions along the path of the refracted light beam, wherein the generating of the light intensity data is further based on the detecting of the plurality of positional light intensities, wherein the light intensity data comprises a plurality of positional light intensity data associated with the plurality of positional light intensities of the refracted light beam at the plurality of positions along the path of the refracted light beam.

5. The apparatus of claim 4, wherein the processing device is further configured for:

identifying a first position from the plurality of positions based on the analyzing, wherein a first positional light intensity of the refracted light beam at the first position is maximum among the plurality of positional light intensities; and generating a first position data for the first position based on the identifying of the first position, wherein the generating of the volume measurement is further based on the first position data.

6. The apparatus of claim 4, wherein the at least one detecting element comprises a plurality of detecting elements, wherein each of the plurality of detecting elements is configured for detecting each of the plurality of positional light intensities of the refracted light beam at each of the plurality of positions along the path of the refracted light beam, wherein the detecting of the plurality of positional light intensities of the refracted light beam at the plurality of positions along the path associated with the refracted light beam is further based on the detecting of each of the plurality of positional light intensities of the refracted light beam at each of the plurality of positions along the path of the refracted light beam.

7. The apparatus of claim 4 further comprising at least one movement assembly coupled with the at least one detecting element, wherein the at least one movement assembly is configured for moving the at least one detecting element in relation to the at least one lighting element for transitioning the at least one detecting element between the plurality of positions, wherein the detecting of the plurality of positional light intensities of the refracted light beam at the plurality of positions along the path of the refracted light beam is further based on the transitioning.

8. The apparatus of claim 1 further comprising at least one panel coupled with the at least one detecting element, wherein the at least one panel comprises at least one slit, wherein the at least one panel is configured for exposing the at least one detecting element to the refracted light beam at a point of convergence of a plurality of light rays of the refracted beam through the at least one slit, wherein the detecting of the intensity of the refracted light beam is further based on the exposing.

9. The apparatus of claim 1, wherein the at least one holding member comprises at least one shading element, wherein the at least one shading element is configured for blocking a portion of the light beam for producing the first light beam portion of the light beam and the second light beam portion of the light beam, wherein the irradiating of the first side region of the at least one container with the first light beam portion and the second side region of the at least one container with the second light beam portion while preventing the irradiation of the central region of the at least one container is based on the blocking.

10. The apparatus of claim 1, wherein the processing device is further configured for determining at least one value of at least one parameter based on the analyzing of the intensity data, wherein the generating of the volume measurement is further based on the at least one value of the at least one parameter, wherein the at least one parameter comprises a focal point of the refracted light beam produced by the irradiating of the at least one container comprising the at least one sample.

11. The apparatus of claim 1, wherein the processing device is further configured for:

determining at least one characteristic of the light beam, wherein the at least one characteristic of the light beam comprises a wavelength of the light beam; and generating at least one command for the at least one lighting element based on the determining of the at least one characteristic of the light beam, wherein the at least one lighting element is operatively coupled with the processing device, wherein the emitting of the light beam comprises emitting the light beam with the at least one characteristic based on the at least one command.

12. The apparatus of claim 11 further comprising at least one input device communicatively coupled with the processing device, wherein the at least one input device is configured for receiving at least one input from a user, wherein the determining of the at least one characteristic of the light beam is based on the at least one input.

13. The apparatus of claim 11 further comprising at least one sensor communicatively coupled with the processing device, wherein the at least one sensor is configured for detecting at least one sample characteristic of the at least one sample comprised in the at least one container, wherein the processing device is further configured for:

generating at least one sample data of the at least one sample based on the detecting of the at least one sample characteristic; and analyzing the at least one sample data, wherein the determining of the at least one characteristic of the light beam is based on the analyzing of the at least one sample data.

14. The apparatus of claim 11 further comprising at least one first sensor communicatively coupled with the processing device, wherein the at least one first sensor is configured for detecting at least one container characteristic of the at least one container comprising the at least one sample, wherein the processing device is further configured for:

generating at least one container data of the at least one container based on the detecting of the at least one container characteristic; and analyzing the at least one container data, wherein the determining of the at least one characteristic of the light beam is based on the analyzing of the at least one container data.

15. The apparatus of claim 1 further comprising a housing for the at least one lighting element, the at least one detecting element, and the at least one holding member, wherein each of the at least one lighting element, the at least one detecting element, and the at least one holding member is comprised in the housing, wherein the housing comprises at least one opening for receiving the at least one container, wherein the holding of the at least one container is based on the receiving.

16. The apparatus of claim 1, wherein the at least one lighting element is further configured for:

emitting a secondary light beam in a first instance, wherein the at least one container is not held between the at least one lighting element and the at least one detecting element in the first instance; and emitting the secondary light beam for irradiating a section of the at least one container associated with the at least one sample in a second instance, wherein the at least one container is held between the at least one lighting element and the at least one detecting element in the second instance, wherein the at least one detecting element is further configured for:

detecting the secondary light beam in the first instance based on the emitting of the secondary light beam in the first instance; and detecting a refracted secondary light beam produced based on the irradiating of the section of the at least one container in the second instance, wherein the processing device is further configured for:

generating a first data based on the detecting of the secondary light beam;

generating a second data based on the detecting of the refracted light beam;

analyzing the first data and the second data; and generating the at least one data based on the analyzing of the first data and the second data, wherein the generating of the volume measurement is further based on the generating of the at least one data.

17. The apparatus of claim 1 further comprising a communication device communicatively coupled with the processing device, wherein the communication device is configured for:

transmitting the volume measurement of the volume of the at least one sample to at least one external device; and receiving a directive signal from the at least one external device, wherein the receiving of the directive signal initiates the measurement of the volume of the sample present in the container.

18. An apparatus for facilitating a measurement of a volume of a sample present in a container, the apparatus comprising:

at least one lighting element;

at least one detecting element spaced apart from the at least one lighting element, wherein the at least one detecting element is aligned with the at least one lighting element;

at least one holding member configured for holding at least one container comprising at least one sample between the at least one lighting element and the at least one detecting element, wherein the at least one lighting element is configured for emitting a light beam for irradiating the at least one container from a first side of the at least one container with the light beam, wherein the light beam comprises a parallel light beam, wherein the irradiating of the at least one container from the first side with the light beam comprises irradiating a first side region of the at least one container with a first light beam portion of the light beam and a second side region of the at least one container with a second light beam portion of the light beam while preventing an irradiation of a central region of the at least one container, wherein the first side region opposes the second side region, wherein the at least one detecting element is configured for detecting a light intensity of a refracted light beam produced based on the irradiating of the at least one container from the first side with the light beam, from a second side of the at least one container, wherein the second side opposes the first side, wherein the detecting of the light intensity of the refracted light beam comprises detecting a plurality of positional light intensities of the refracted light beam at a plurality of positions along a path associated with the refracted light beam;

a processing device communicatively coupled with the at least one detecting element, wherein the processing device is configured for:

generating a light intensity data associated with the light intensity of the refracted light beam based on the detecting, wherein the generating of the light intensity data is further based on the detecting of the plurality of positional light intensities, wherein the light intensity data comprises a plurality of positional light intensity data associated with the plurality of positional light intensities of the refracted light beam at the plurality of positions along the path of the refracted light beam;

analyzing the light intensity data; and generating a volume measurement of the volume of the at least one sample comprised in the at least one container based on the analyzing of the light intensity data and at least one data; and a storage device communicatively coupled with the processing device, wherein the storage device is configured for storing the volume measurement.

19. The apparatus of claim 18, wherein the processing device is further configured for:

identifying a first position from the plurality of positions based on the analyzing, wherein a first positional light intensity of the refracted light beam at the first position is maximum among the plurality of positional light intensities; and generating a first position data for the first position based on the identifying of the first position, wherein the generating of the volume measurement is further based on the first position data.

20. An apparatus for facilitating a measurement of a volume of a sample present in a container, the apparatus comprising:

at least one lighting element;

at least one detecting element spaced apart from the at least one lighting element, wherein the at least one detecting element is aligned with the at least one lighting element;

at least one holding member configured for holding at least one container comprising at least one sample between the at least one lighting element and the at least one detecting element, wherein the at least one lighting element is configured for emitting a light beam for irradiating the at least one container from a first side of the at least one container with the light beam, wherein the at least one detecting element is configured for detecting a light intensity of a refracted light beam produced based on the irradiating of the at least one container from the first side with the light beam, from a second side of the at least one container, wherein the second side opposes the first side, wherein the detecting of the light intensity of the refracted light beam comprises detecting a plurality of positional light intensities of the refracted light beam at a plurality of positions along a path associated with the refracted light beam;

a processing device communicatively coupled with the at least one detecting element, wherein the processing device is configured for:

generating a light intensity data associated with the light intensity of the refracted light beam based on the detecting, wherein the generating of the light intensity data is further based on the detecting of the plurality of positional light intensities, wherein the light intensity data comprises a plurality of positional light intensity data associated with the plurality of positional light intensities of the refracted light beam at the plurality of positions along the path of the refracted light beam;

analyzing the light intensity data; and generating a volume measurement of the volume of the at least one sample comprised in the at least one container based on the analyzing of the light intensity data and at least one data;

a storage device communicatively coupled with the processing device, wherein the storage device is configured for storing the volume measurement; and at least one movement assembly coupled with the at least one detecting element, wherein the at least one movement assembly is configured for moving the at least one detecting element in relation to the at least one lighting element for transitioning the at least one detecting element between the plurality of positions, wherein the detecting of the plurality of positional light intensities of the refracted light beam at the plurality of positions along the path of the refracted light beam is further based on the transitioning.

* * * * *